(12) United States Patent
Chen

(10) Patent No.: US 10,511,984 B2
(45) Date of Patent: Dec. 17, 2019

(54) CHANNEL STATE INFORMATION FEEDBACK METHOD AND TERMINAL

(71) Applicant: CHINA ACADEMY OF TELECOMMUNICATIONS TECHNOLOGY, Beijing (CN)

(72) Inventor: Wenhong Chen, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 21 days.

(21) Appl. No.: 15/576,273

(22) PCT Filed: May 11, 2016

(86) PCT No.: PCT/CN2016/081729
§ 371 (c)(1),
(2) Date: Nov. 21, 2017

(87) PCT Pub. No.: WO2016/184335
PCT Pub. Date: Nov. 24, 2016

(65) Prior Publication Data
US 2018/0152858 A1    May 31, 2018

(30) Foreign Application Priority Data

May 21, 2015  (CN) .......................... 2015 1 0263161
May 28, 2015  (CN) .......................... 2015 1 0282902

(51) Int. Cl.
*H04W 24/10*  (2009.01)
*H04L 1/00*  (2006.01)
(Continued)

(52) U.S. Cl.
CPC .......... *H04W 24/10* (2013.01); *H04B 7/0456* (2013.01); *H04B 7/0617* (2013.01);
(Continued)

(58) Field of Classification Search
CPC .... H04W 24/00; H04L 43/50; H04L 43/0852; H04L 43/08; H04B 17/003
See application file for complete search history.

(56) References Cited

U.S. PATENT DOCUMENTS 8,675,794 B1 *  3/2014  Perets .................. H04L 1/0003
375/225
8,861,662 B1 * 10/2014  Perets .................. H04L 1/0003
375/225
(Continued)

FOREIGN PATENT DOCUMENTS

CN    102055508    5/2011
CN    102065560    5/2011
(Continued)

OTHER PUBLICATIONS

From JP Application No. 2017560695, Notification of Reasons for Refusal, dated Nov. 27, 2018, with machine English translation from JPO.
(Continued)

*Primary Examiner* — Ajay Cattungal
*Assistant Examiner* — Prenell P Jones
(74) *Attorney, Agent, or Firm* — Ladas & Parry, LLP

(57) ABSTRACT

A channel state information (CSI) feedback method and a terminal are provided to enable the terminal to determine a CSI feedback approach based on received information for CSI feedback and perform CSI measurement and CSI feedback. A network device indicates a CSI feedback configuration group for CSI feedback to the terminal. After receiving the CSI feedback configuration group, the terminal determines the CSI feedback approach corresponding to the CSI feedback configuration group.

18 Claims, 4 Drawing Sheets

301
indicating, by a network device, a CSI feedback configuration group for a CSI feedback to a terminal 302
receiving, by the network device, CSI which is obtained through a CSI measurement based on a determined CSI feedback approach corresponding to the CSI feedback configuration group and fed back by the terminal

(51) Int. Cl.
*H04B 17/309* (2015.01)
*H04B 7/06* (2006.01)
*H04W 72/04* (2009.01)
*H04B 7/0456* (2017.01)
*H04W 88/02* (2009.01)

(52) U.S. Cl.
CPC ......... *H04B 7/0626* (2013.01); *H04B 7/0632* (2013.01); *H04B 7/0636* (2013.01); *H04B 7/0658* (2013.01); *H04B 17/309* (2015.01); *H04L 1/0026* (2013.01); *H04L 1/0027* (2013.01); *H04L 1/0029* (2013.01); *H04W 72/044* (2013.01); *H04W 72/0413* (2013.01); *H04W 88/02* (2013.01)

(56) References Cited

U.S. PATENT DOCUMENTS

| | | | |
|---|---|---|---|
| 9,264,915 B2* | 2/2016 | Seo | H04B 7/0626 |
| 2012/0176939 A1 | 7/2012 | Qu et al. | |
| 2012/0208541 A1 | 8/2012 | Luo et al. | |
| 2012/0281567 A1 | 11/2012 | Gao et al. | |
| 2012/0287875 A1 | 11/2012 | Kim et al. | |
| 2012/0300654 A1* | 11/2012 | Gan | H04B 7/155 370/252 |
| 2012/0322477 A1 | 12/2012 | Kang et al. | |
| 2013/0021926 A1 | 1/2013 | Geirhofer et al. | |
| 2013/0077581 A1 | 3/2013 | Lee et al. | |
| 2013/0114425 A1 | 5/2013 | Sayana et al. | |
| 2013/0301465 A1* | 11/2013 | Seo | H04B 7/0626 370/252 |
| 2014/0226509 A1 | 8/2014 | Ko et al. | |
| 2014/0226612 A1 | 8/2014 | Kim et al. | |
| 2014/0241323 A1* | 8/2014 | Park | H04L 5/0035 370/332 |
| 2014/0254705 A1* | 9/2014 | Chun | H04B 7/0626 375/267 |
| 2014/0293815 A1 | 10/2014 | Xia et al. | |
| 2014/0321359 A1 | 10/2014 | Seo et al. | |
| 2015/0029875 A1 | 1/2015 | Zhu et al. | |
| 2015/0071187 A1 | 3/2015 | Chen et al. | |
| 2015/0098346 A1 | 4/2015 | Guo et al. | |
| 2015/0103774 A1 | 4/2015 | Nagata et al. | |
| 2015/0289155 A1 | 10/2015 | Gao | |
| 2016/0013851 A1* | 1/2016 | Lee | H04W 24/00 370/252 |
| 2016/0013900 A1* | 1/2016 | Lee | H04W 24/00 370/328 |
| 2016/0105882 A1* | 4/2016 | Park | H04B 7/024 370/329 |
| 2016/0149679 A1* | 5/2016 | Frenne | H04L 5/005 370/329 |

FOREIGN PATENT DOCUMENTS

| | | |
|---|---|---|
| CN | 102281128 A | 5/2011 |
| CN | 102291224 | 12/2011 |
| CN | 102315871 | 1/2012 |
| CN | 102546113 A | 7/2012 |
| CN | 102754458 | 10/2012 |
| CN | 103166734 A | 6/2013 |
| CN | 103546208 A | 1/2014 |
| CN | 103840907 A | 6/2014 |
| CN | 104380641 A | 2/2015 |
| EP | 2827518 A1 | 1/2015 |
| EP | 2925042 A1 | 9/2015 |
| JP | 2012114814 | 6/2012 |
| JP | 2014524679 A | 9/2014 |
| WO | 2008138165 A1 | 11/2008 |
| WO | 2011/108880 A2 | 9/2011 |
| WO | 2012065579 A2 | 5/2012 |
| WO | 2012071911 | 6/2012 |
| WO | 2012150842 | 11/2012 |
| WO | 2014008833 | 1/2014 |
| WO | 2014/020434 A1 | 2/2014 |
| WO | 2014079329 | 5/2014 |

OTHER PUBLICATIONS

International Search Report for PCT/CN2013/086994, dated Jan. 23, 2014, and its English translation provided by WIPO.
Written Opinion of the International Search Authority for PCT/CN2013/086994, dated Jan. 23, 2014, and its English translation provided by WIPO.
International Preliminary Report on Patentability for PCT/CN2013/086994, dated May 26, 2015.
From European patent application 13856268.1, Supplementary European Search Report dated Nov. 19, 2015.
From European patent application 13856268.1, European Search Opinion dated Nov. 19, 2015.
From European patent application 13856268.1, Office action dated Jul. 20, 2017.
From U.S. Appl. No. 14/646,203, Office action dated Oct. 7, 2016.
From U.S. Appl. No. 14/646,203, Office action dated Mar. 13, 2017.
From U.S. Appl. No. 14/646,203, Advisoiy action dated May 26, 2017.
From U.S. Appl. No. 14/646,203, Office action dated Aug. 2, 2017.
From U.S. Appl. No. 14/646,203, Notice of Allowance dated Nov. 22, 2017.
International Search Report for PCT/CN2013/078860, dated Oct. 3, 2013, and its English translation provided by WIPO.
Written Opinion of the International Search Authority for PCT/CN2013/078860, dated Oct. 3, 2013, and its English translation provided by WIPO.
International Preliminary Report on Patentability for PCT/CN2013/078860, dated Jan. 13, 2015.
International Search Report for PCT/CN2016/081729, dated Jul. 1, 2016, and its English translation provided by WIPO.
Written Opinion of the International Search Authority for PCT/CN2016/081729, dated Jul. 1, 2016, and its English translation provided by WIPO.
From CN201210476801.6, 1$^{st}$ office action, dated Jul. 29, 2016, with an English Translation from Espacenet Global Dossier.
From CN201210476801.6, 2nd office action, dated Mar. 20, 2017, with an English Translation from Espacenet Global Dossier.
From CN201210476801.6, 3rd office action, dated Sep. 7, 2017, with an English Translation from Espacenet Global Dossier.
From CN201210476801.6, First Search Report, dated Jul. 20, 2016.
From CN201210476801.6, Supplementary Search Report, dated Aug. 30, 2017.
From CN201210237958.3, 1st office action, dated Dec. 28, 2015, with an English Translation from Espacenet Global Dossier.
From CN201210237958.3, First Search Report, dated Dec. 18, 2015.
From CN201210237958.3, Supplementary Search Report, dated May 18, 2016.
From EPO Application No. 16795822.2, Supplementary European Search Report with Search Opinion dated Apr. 20, 2018.
From TW Application No. 105115442, Office Action dated Apr. 19, 2017 with machine English translation from Google Translate.
R1-152660—Alcatel-Lucent Shanghai Bell et al.: "Performance Evaluations for beamformed CSI-RS-based schemes in 3D MIMO." 3GPP TSG RAN WG1 Meeting#81. Fukuoka, Japan, May 25-29, 2015; pp. 1-2.

* cited by examiner

CHANNEL STATE INFORMATION FEEDBACK METHOD AND TERMINAL

CROSS-REFERENCE TO RELATED APPLICATIONS

The present application is the U.S. national phase of PCT Application No. PCT/CN2016/081729 filed on May 11, 2016, which claims priority to Chinese Patent Application No. 201510263161.4 filed on May 21, 2015 and Chinese Patent Application No. 201510282902.3 filed on May 28, 2015, the disclosures of which are incorporated in their entireties by reference herein.

TECHNICAL FIELD

The present disclosure relates to the telecommunications field, and more particularly, to a channel state information feedback method and a terminal.

BACKGROUND

In current cellular system, an array of antennas of a network device (e.g., a base station) is usually arranged horizontally; here, FIG. 1a shows dual-polarized antennas arranged horizontally and FIG. 1b shows linear array antennas arranged horizontally. Beams at a transmitting end of the network device can only be adjusted in the horizontal direction, while the beams have a fixed downtilt in the vertical direction; hence, various beamforming techniques and pre-coding techniques are all based on channel information in the horizontal direction. Actually, a wireless signal is transmitted in a three-dimensional manner in space, and the fixed downtilt cannot achieve an optimum system performance. Beam adjustment in vertical direction is important for reducing inter-cell interference and improving the system performance. As antenna technology gets advanced, each antenna element of an active antenna can be controlled independently. By applying such active antenna in an antenna array, the beams can be adjusted in the vertical direction. Here, FIG. 1c shows dual-polarized antennas arranged horizontally and vertically and FIG. 1d shows linear array antennas arranged horizontally and vertically.

With a three-dimensional antenna array, a signal transmitted from a network device can be beamformed not only in the horizontal direction but also in the vertical direction with respect to the terminal. In order to determine a vertical beamforming vector by the network device such that a beam in the vertical direction can be oriented to the terminal to achieve a largest beamforming gain, the terminal usually needs to feed back channel state information (CSI) in the vertical direction.

In the case that the network device supports full-dimension multi-input-multi-output (FD-MIMO) technique, i.e., supports a CSI beamforming transmitting way, the terminal needs to report CSI corresponding to an optimum CSI feedback configuration and location information of the CSI, such that the network device can current optimum beam information. In the case that the network device does not support the FD-MIMO, the terminal needs to report CSI corresponding to each CSI feedback configuration without any location information of the CSI. Since the terminal is not aware of whether the network device is provided with a number of antennas and whether the network device supports the FD-MIMO, the terminal cannot determine the CSI feedback approach.

In view of the above, it is necessary to provide a CSI feedback method and a terminal to enable the terminal to determine the CSI feedback approach based on received information for CSI feedback and to perform CSI measurement and CSI feedback based on the determined CSI feedback approach.

SUMMARY

The embodiments of the present disclosure provide a CSI feedback method and a terminal to enable the terminal to determine the CSI feedback approach based on received information for CSI feedback and to perform CSI measurement and CSI feedback based on the determined CSI feedback approach.

A channel state information (CSI) feedback method is provided according to some embodiments of the present disclosure, including:

receiving a CSI feedback configuration group indicated by a network device for a CSI feedback; determining a CSI feedback approach corresponding to the CSI feedback configuration group; and performing a CSI measurement and the CSI feedback based on the determined CSI feedback approach.

Optionally, the CSI feedback approach comprises a first feedback approach and a second feedback approach. The first feedback approach comprises: feeding back CSI obtained through a measurement based on each CSI feedback configuration in the CSI feedback configuration group. The second feedback approach comprises: selecting an optimum CSI feedback configuration from the CSI feedback configuration group, and feeding back CSI obtained through a measurement based on the optimum CSI feedback configuration in the CSI feedback configuration group and location information of the optimum CSI feedback configuration in the CSI feedback configuration group.

Optionally, the step of selecting the optimum CSI feedback configuration from the CSI feedback configuration group comprises: measuring a reference signal receiving power (RSRP) for each CSI feedback configuration in the CSI feedback configuration group, and selecting a CSI feedback configuration corresponding to a largest RSRP in one or a plurality of RSRPs determined through the measurement as the optimum CSI feedback configuration in the CSI feedback configuration group; or estimating a channels quality indication (CQI) for each CSI feedback configuration in the CSI feedback configuration group, and selecting a CSI feedback configuration corresponding to a largest CQI in one or a plurality of CQIs determined through the estimation as the optimum CSI feedback configuration in the CSI feedback configuration group; or performing a CSI measurement on each CSI feedback configuration in the CSI feedback configuration group, obtaining a transport block size (TBsize) corresponding to each CSI feedback configuration based on a result of the CSI measurement, and selecting a CSI feedback configuration corresponding to a largest TBsize in one or a plurality of obtained TBsizes as the optimum CSI feedback configuration in the CSI feedback configuration group.

Optionally, the location information of the optimum CSI feedback configuration in the CSI feedback configuration group refers to an index of the optimum CSI feedback configuration in the CSI feedback configuration group, or refers to a value of a corresponding bit where the optimum CSI feedback configuration is located in a location list corresponding to the CSI feedback configuration group.

Each CSI feedback configuration in the CSI feedback configuration group corresponds to one location in the location list.

Optionally, in the case that the determined feedback approach is the second feedback approach and the CSI that is obtained through the measurement based on the optimum CSI feedback configuration in the CSI feedback configuration group and fed back comprises a rank indicator (RI), a feedback period of the location information is N times of a feedback period of the RI and a PUCCH resource location of the location information is identical to a PUCCH resource location of the RI, where N is a positive integer.

Optionally, in the case that the location information and the RI are fed back in one subframe, the location information and the RI are first joint-coded or cascaded and then fed back.

Optionally, in the case that the location information and the RI are fed back in one subframe, the RI is obtained through a measurement based on an optimum CSI feedback configuration corresponding to the location information fed back in the subframe.

Optionally, in the case that the location information and the RI are fed back in different subframes, the RI is obtained through a CSI measurement based on an optimum CSI feedback configuration corresponding to the location information that is most recently fed back.

Optionally, the step of determining the CSI feedback approach corresponding to the CSI feedback configuration group comprises: determining the CSI feedback approach corresponding to the CSI feedback configuration group based on a quantity of a CSI feedback configuration comprised in the CSI feedback configuration group; or determining the CSI feedback approach corresponding to the CSI feedback configuration group based on a quantity of a CSI feedback configuration comprised in the CSI feedback configuration group and requiring the CSI feedback; or determining the CSI feedback approach corresponding to the CSI feedback configuration group based on feedback approach indication information comprised in a received triggering signaling of an aperiodic CSI feedback; or determining the CSI feedback approach corresponding to the CSI feedback configuration group based on feedback approach indication information corresponding to the CSI feedback configuration group, wherein each CSI feedback configuration group is configured with corresponding feedback approach indication information; or determining the CSI feedback approach corresponding to the CSI feedback configuration group based on a feedback mode of the CSI feedback configuration group, wherein the feedback mode of the CSI feedback configuration group comprises a periodic CSI feedback and an aperiodic CSI feedback.

Optionally, the step of determining the CSI feedback approach corresponding to the CSI feedback configuration group based on the quantity of the CSI feedback configuration comprised in the CSI feedback configuration group comprises: determining a first feedback approach to be applied for the CSI feedback configuration group in the case that the CSI feedback configuration group comprises only one CSI feedback configuration, wherein the first feedback approach refers to feed back CSI corresponding to each CSI feedback configuration in the CSI feedback configuration group; or determining a second feedback approach to be applied for the CSI feedback configuration group in the case that the CSI feedback configuration group comprises a plurality of CSI feedback configurations, wherein the second feedback approach refers to feed back CSI corresponding to an optimum CSI feedback configuration in the CSI feedback configuration group and location information of the optimum CSI feedback configuration in the CSI feedback configuration group.

Optionally, the step of determining the CSI feedback approach corresponding to the CSI feedback configuration group based on the quantity of the CSI feedback configuration comprised in the CSI feedback configuration group and requiring the CSI feedback comprises: determining, in the case that each CSI feedback configuration in the CSI feedback configuration group requires the CSI feedback, a first feedback approach to be applied for the CSI feedback configuration group; otherwise, determining a second feedback approach to be applied for the CSI feedback configuration group. The first feedback approach refers to feed back CSI corresponding to each CSI feedback configuration in the CSI feedback configuration group, and the second feedback approach refers to feed back CSI corresponding to an optimum CSI feedback configuration in the CSI feedback configuration group and location information of the optimum CSI feedback configuration in the CSI feedback configuration group.

Optionally, the quantity of the CSI feedback configuration comprised in the CSI feedback configuration group and requiring the CSI feedback is predetermined; or the quantity of the CSI feedback configuration comprised in the CSI feedback configuration group and requiring the CSI feedback is configured by the network device; orthe quantity of the CSI feedback configuration comprised in the CSI feedback configuration group and requiring the CSI feedback is indicated by the network device via indication information comprised in the triggering signaling of the aperiodic CSI feedback.

Optionally, the feedback approach indication information corresponding to the CSI feedback configuration group is comprised in the CSI feedback configuration group.

Optionally, the step of determining the CSI feedback approach corresponding to the CSI feedback configuration group based on the feedback mode of the CSI feedback configuration group comprises: determining, in the case that the feedback mode of the CSI feedback configuration group is the periodic CSI feedback, a first feedback approach as the CSI feedback approach corresponding to the CSI feedback configuration group, where the first feedback approach refers to feed back CSI corresponding to each CSI feedback configuration in the CSI feedback configuration group; or determining, in the case that the feedback mode of the CSI feedback configuration group is the aperiodic CSI feedback, a second feedback approach as the CSI feedback approach corresponding to the CSI feedback configuration group, where the second feedback approach refers to feed back CSI corresponding to an optimum CSI feedback configuration in the CSI feedback configuration group and location information of the optimum CSI feedback configuration in the CSI feedback configuration group.

A terminal is provided according to some embodiments of the present disclosure, including: a receiving unit, configured to receive a channel state information (CSI) feedback configuration group indicated by a network device for a CSI feedback; a determining unit, configured to determine a CSI feedback approach corresponding to the CSI feedback configuration group; and a processing unit, configured to perform a CSI measurement and the CSI feedback based on the determined CSI feedback approach.

Optionally, the CSI feedback approach comprises a first feedback approach and a second feedback approach. The first feedback approach comprises: feeding back CSI obtained through a measurement based on each CSI feedback configuration in the CSI feedback configuration group. The second feedback approach comprises: selecting an optimum CSI feedback configuration from the CSI feedback configuration group, and feeding back CSI obtained through a measurement based on the optimum CSI feedback configuration in the CSI feedback configuration group and location information of the optimum CSI feedback configuration in the CSI feedback configuration group.

Optionally, the processor is configured to: measure a reference signal receiving power (RSRP) for each CSI feedback configuration in the CSI feedback configuration group and select a CSI feedback configuration corresponding to a largest RSRP in one or a plurality of RSRPs determined through the measurement as the optimum CSI feedback configuration in the CSI feedback configuration group; or estimate a channels quality indication (CQI) for each CSI feedback configuration in the CSI feedback configuration group and select a CSI feedback configuration corresponding to a largest CQI in one or a plurality of CQIs determined through the estimation as the optimum CSI feedback configuration in the CSI feedback configuration group; or perform a CSI measurement on each CSI feedback configuration in the CSI feedback configuration group, obtain a transport block size (TBsize) corresponding to each CSI feedback configuration based on a result of the CSI measurement, and select a CSI feedback configuration corresponding to a largest TBsize in one or a plurality of obtained TBsizes as the optimum CSI feedback configuration in the CSI feedback configuration group.

Optionally, the location information of the optimum CSI feedback configuration in the CSI feedback configuration group refers to an index of the optimum CSI feedback configuration in the CSI feedback configuration group, or refers to a value of a corresponding bit where the optimum CSI feedback configuration is located in a location list corresponding to the CSI feedback configuration group, where each CSI feedback configuration in the CSI feedback configuration group corresponds to one location in the location list.

Optionally, in the case that the determined feedback approach is the second feedback approach and the CSI that is obtained through the measurement based on the optimum CSI feedback configuration in the CSI feedback configuration group and fed back comprises a rank indicator (RI), a feedback period of the location information is N times of a feedback period of the RI and a PUCCH resource location of the location information is identical to a PUCCH resource location of the RI, where N is a positive integer.

Optionally, in the case that the location information and the RI are fed back in one subframe, the location information and the RI are first joint-coded or cascaded and then fed back.

Optionally, in the case that the location information and the RI are fed back in one subframe, the RI is obtained through a measurement based on an optimum CSI feedback configuration corresponding to the location information fed back in the subframe.

Optionally, in the case that the location information and the RI are fed back in different subframes, the RI is obtained through a CSI measurement based on an optimum CSI feedback configuration corresponding to the location information that is most recently fed back.

Optionally, the determining unit is configured to: determine the CSI feedback approach corresponding to the CSI feedback configuration group based on a quantity of a CSI feedback configuration comprised in the CSI feedback configuration group; or determine the CSI feedback approach corresponding to the CSI feedback configuration group based on a quantity of a CSI feedback configuration comprised in the CSI feedback configuration group and requiring the CSI feedback; or determine the CSI feedback approach corresponding to the CSI feedback configuration group based on feedback approach indication information comprised in a received triggering signaling of an aperiodic CSI feedback; or determine the CSI feedback approach corresponding to the CSI feedback configuration group based on feedback approach indication information corresponding to the CSI feedback configuration group, each CSI feedback configuration group being configured with corresponding feedback approach indication information; or determine the CSI feedback approach corresponding to the CSI feedback configuration group based on a feedback mode of the CSI feedback configuration group, the feedback mode of the CSI feedback configuration group comprising a periodic CSI feedback and an aperiodic CSI feedback.

Optionally, the determining unit is configured to: determine, in the case that the CSI feedback configuration group comprises only one CSI feedback configuration, a first feedback approach to be applied for the CSI feedback configuration group, wherein the first feedback approach refers to feed back CSI corresponding to each CSI feedback configuration in the CSI feedback configuration group; or determine, in the case that the CSI feedback configuration group comprises a plurality of CSI feedback configurations, a second feedback approach to be applied for the CSI feedback configuration group, wherein the second feedback approach refers to feed back CSI corresponding to an optimum CSI feedback configuration in the CSI feedback configuration group and location information of the optimum CSI feedback configuration in the CSI feedback configuration group.

Optionally, the determining unit is configured to: determine, in the case that each CSI feedback configuration in the CSI feedback configuration group requires the CSI feedback, a first feedback approach to be applied for the CSI feedback configuration group; otherwise, determine a second feedback approach to be applied for the CSI feedback configuration group. The first feedback approach refers to feed back CSI corresponding to each CSI feedback configuration in the CSI feedback configuration group, and the second feedback approach refers to feed back CSI corresponding to an optimum CSI feedback configuration in the CSI feedback configuration group and location information of the optimum CSI feedback configuration in the CSI feedback configuration group.

Optionally, the quantity of the CSI feedback configuration comprised in the CSI feedback configuration group and requiring the CSI feedback is predetermined; or the quantity of the CSI feedback configuration comprised in the CSI feedback configuration group and requiring the CSI feedback is configured by the network device; or the quantity of the CSI feedback configuration comprised in the CSI feedback configuration group and requiring the CSI feedback is indicated by the network device via indication information comprised in the triggering signaling of the aperiodic CSI feedback.

Optionally, the feedback approach indication information corresponding to the CSI feedback configuration group is comprised in the CSI feedback configuration group.

Optionally, the determining unit is configured to: determine, in the case that the feedback mode of the CSI feedback configuration group is the periodic CSI feedback, a first feedback approach as the CSI feedback approach corresponding to the CSI feedback configuration group, wherein the first feedback approach refers to feed back CSI corresponding to each CSI feedback configuration in the CSI feedback configuration group; or determine, in the case that the feedback mode of the CSI feedback configuration group is the aperiodic CSI feedback, a second feedback approach as the CSI feedback approach corresponding to the CSI feedback configuration group, wherein the second feedback approach refers to feed back CSI corresponding to an optimum CSI feedback configuration in the CSI feedback configuration group and location information of the optimum CSI feedback configuration in the CSI feedback configuration group.

A terminal is provided according to some embodiments of the present disclosure, including: a processor, configured to read a program in a memory to: receive a channel state information (CSI) feedback configuration group indicated by a network device for a CSI feedback, determine a CSI feedback approach corresponding to the CSI feedback configuration group, and perform a CSI measurement and the CSI feedback based on the determined CSI feedback approach; and a transceiver configured to receive and transmit data under control of the processor.

Optionally, the CSI feedback approach may include a first feedback approach and a second feedback approach. For the first feedback approach, CSI obtained through a measurement based on each CSI feedback configuration in a CSI feedback configuration group is fed back. For the second feedback approach, an optimum CSI feedback configuration is selected from the CSI feedback configuration group, then CSI obtained through a measurement based on the optimum CSI feedback configuration in the CSI feedback configuration group and location information of the optimum CSI feedback configuration in the CSI feedback configuration group are fed back.

Optionally, the processor is used to: measure a reference signal receiving power (RSRP) for each CSI feedback configuration in the CSI feedback configuration group and select a CSI feedback configuration corresponding to a largest RSRP in one or multiple RSRPs determined through the measurement as the optimum CSI feedback configuration in the CSI feedback configuration group; or estimate a channels quality indication (CQI) for each CSI feedback configuration in the CSI feedback configuration group and select a CSI feedback configuration corresponding to a largest CQI in one or multiple CQIs determined through the estimation as the optimum CSI feedback configuration in the CSI feedback configuration group; or perform a CSI measurement on each CSI feedback configuration in the CSI feedback configuration group, obtain a transport block size (TB size) corresponding to each CSI feedback configuration based on a result of the CSI measurement, and select a CSI feedback configuration corresponding to a largest TBsize in one or multiple obtained TBsizes as the optimum CSI feedback configuration in the CSI feedback configuration group.

Optionally, the location information of the optimum CSI feedback configuration in the CSI feedback configuration group refers to an index of the optimum CSI feedback configuration in the CSI feedback configuration group, or refers to a value of a corresponding bit where the optimum CSI feedback configuration is located in a location list corresponding to the CSI feedback configuration group, where each CSI feedback configuration in the CSI feedback configuration group corresponds to one location in the location list.

Optionally, in the case that the determined feedback approach is the second feedback approach and the CSI that is obtained through the measurement based on the optimum CSI feedback configuration in the CSI feedback configuration group and fed back includes a rank indicator (RI), a feedback period of the location information is N times of a feedback period of the RI and a PUCCH resource location of the location information is identical to a PUCCH resource location of the RI. Here, N is a positive integer.

Optionally, in the case that the location information and the RI are fed back in one subframe, the location information and the RI are first joint-coded or cascaded and then fed back.

Optionally, in the case that the location information and the RI are fed back in one subframe, the RI is obtained through a measurement based on an optimum CSI feedback configuration corresponding to the location information fed back in the subframe.

Optionally, in the case that the location information and the RI are fed back in different subframes, the RI is obtained through a CSI measurement based on an optimum CSI feedback configuration corresponding to location information that is most recently fed back.

Optionally, the processor is used to: determine the CSI feedback approach corresponding to the CSI feedback configuration group based on a quantity of a CSI feedback configuration included in the CSI feedback configuration group; or determine the CSI feedback approach corresponding to the CSI feedback configuration group based on a quantity of a CSI feedback configuration included in the CSI feedback configuration group and requiring CSI feedback; or determine the CSI feedback approach corresponding to the CSI feedback configuration group based on feedback approach indication information included in a received triggering signaling of an aperiodic CSI feedback; or determine the CSI feedback approach corresponding to the CSI feedback configuration group based on feedback approach indication information corresponding to the CSI feedback configuration group, each CSI feedback configuration group being configured with corresponding feedback approach indication information; or determine the CSI feedback approach corresponding to the CSI feedback configuration group based on a feedback mode of the CSI feedback configuration group, the feedback mode of the CSI feedback configuration group including a periodic CSI feedback and an aperiodic CSI feedback.

Optionally, the processor is used to: determine, in the case that the CSI feedback configuration group includes only one CSI feedback configuration, the first feedback approach to be applied for the CSI feedback configuration group, where the first feedback approach refers to feed back CSI corresponding to each CSI feedback configuration in the CSI feedback configuration group; or determine, in the case that the CSI feedback configuration group includes multiple CSI feedback configurations, the second feedback approach to be applied for the CSI feedback configuration group, where the second feedback approach refers to feed back CSI corresponding to an optimum CSI feedback configuration in the CSI feedback configuration group and location information of the optimum CSI feedback configuration in the CSI feedback configuration group.

Optionally, the processor is used to: determine, in the case that each CSI feedback configuration in the CSI feedback configuration group requires CSI feedback, the first feedback approach to be applied for the CSI feedback configuration group; otherwise, determine the second feedback approach to be applied for the CSI feedback configuration group. The first feedback approach refers to feed back CSI corresponding to each CSI feedback configuration in the CSI feedback configuration group. The second feedback approach refers to feed back CSI corresponding to an optimum CSI feedback configuration in the CSI feedback configuration group and location information of the optimum CSI feedback configuration in the CSI feedback configuration group.

Optionally, the quantity of the CSI feedback configuration included in the CSI feedback configuration group and requiring CSI feedback is predetermined; or the quantity of the CSI feedback configuration included in the CSI feedback configuration group and requiring CSI feedback is configured by the network device; or the quantity of the CSI feedback configuration included in the CSI feedback configuration group and requiring CSI feedback is indicated by the network device via indication information included in a triggering signaling of an aperiodic CSI feedback.

Optionally, the feedback approach indication information corresponding to the CSI feedback configuration group is included in the CSI feedback configuration group.

Optionally, the processor is used to: determine, in the case that the feedback mode of the CSI feedback configuration group is the periodic CSI feedback, the first feedback approach as the CSI feedback approach corresponding to the CSI feedback configuration group, where the first feedback approach refers to feed back CSI corresponding to each CSI feedback configuration in the CSI feedback configuration group; or determine, in the case that the feedback mode of the CSI feedback configuration group is the aperiodic CSI feedback, the second feedback approach as the CSI feedback approach corresponding to the CSI feedback configuration group, where the second feedback approach refers to feed back CSI corresponding to an optimum CSI feedback configuration in the CSI feedback configuration group and location information of the optimum CSI feedback configuration in the CSI feedback configuration group.

A terminal is provided according to some embodiments of the present disclosure, including: a processor and a transceiver. The processor is configured to read a program in a memory to: receive a channel state information (CSI) feedback configuration group indicated by a network device for a CSI feedback, determine a CSI feedback approach corresponding to the CSI feedback configuration group, and perform a CSI measurement and the CSI feedback based on the determined CSI feedback approach. The transceiver is configured to receive and transmit data under control of the processor.

In the embodiments of the present disclosure, the network device indicates the CSI feedback configuration group for CSI feedback to the terminal, and after receiving the CSI feedback configuration group, the terminal determines a CSI feedback approach corresponding to the CSI feedback configuration group. In this way, the terminal performs CSI measurement and CSI feedback based on the CSI feedback configuration group configured by the network device, the terminal can support CSI feedback approaches under both an FD-MIMO mode and a non-FD-MIMO mode of the network device.

BRIEF DESCRIPTION OF THE DRAWINGS

For clarifying technical solutions of embodiments of the present disclosure, drawings to be used in description of the embodiments are briefly introduced hereinafter. Apparently, the introduced drawings are for a part of the embodiments. The ordinary skilled in the art can obtain other drawings based on those introduced drawings without paying creative efforts.

DETAILED DESCRIPTION

Figure 1A:
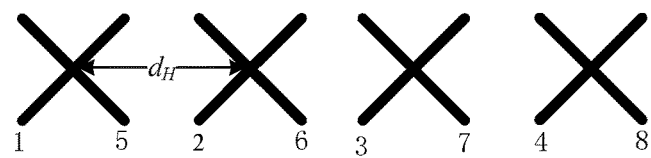
FIG. 1a is a schematic diagram of dual-polarized antennas arranged horizontally in related technology.
Figure 1B:
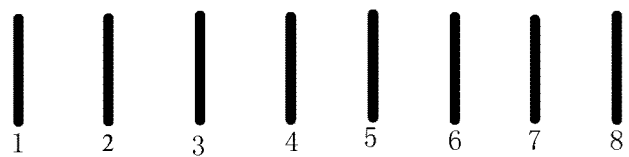
FIG. 1b is a schematic diagram of linear array antennas arranged horizontally in related technology.
Figure 1C:
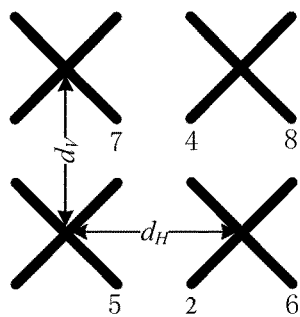
FIG. 1c is a schematic diagram of dual-polarized antennas arranged horizontally and vertically in related technology.
Figure 1D:
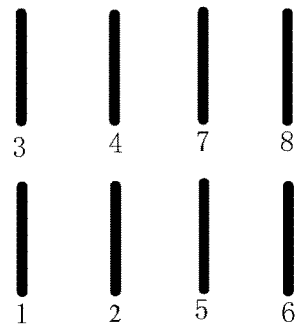
FIG. 1d is a schematic diagram of linear array antennas arranged horizontally and vertically in related technology.

For clarifying objectives, technical solutions and beneficial effects of the present disclosure, detailed descriptions are given hereinafter based on embodiments in conjunction with drawings. It should be understood that the following described embodiments are merely used to explain rather than to limit the present disclosure.

There are two CSI feedback approach in embodiments of the present disclosure: a first feedback approach and a second feedback approach. For the first feedback approach, CSI obtained through a measurement based on each CSI feedback configuration in a CSI feedback configuration group is fed back. For the second feedback approach, an optimum CSI feedback configuration is selected from the CSI feedback configuration group, then CSI obtained through a measurement based on the optimum CSI feedback configuration in the CSI feedback configuration group and location information of the optimum CSI feedback configuration in the CSI feedback configuration group are fed back. In addition to the first feedback approach and the second feedback approach, other kinds of feedback approaches can also be applied in the embodiments of the present disclosure, for example, CSI obtained through a measurement based on several CSI feedback configurations can be fed back.

For the above-mentioned two feedback approaches, the first feedback approach needs to feed back the CSI obtained through the measurement based on each CSI feedback configuration in the CSI feedback configuration group, which results in large cost and high complexity for a terminal. Hence, the first feedback approach has lower efficiency than the second feedback approach.

The concept of CSI process is introduced in to LTE system for supporting coordination multi-point (CoMP). Each CSI process may correspond to one NZP CSI-RS configuration and one interference measurement resource (IMR) configuration. A terminal performs a channel measurement based on the NZP CSI-RS and performs an interference measurement using the corresponding IMR, thereby obtaining and feeding back CSI corresponding to each process. Each LTE terminal can be configured with at most three CSI processes for CSI feedback. CSI feedback of the terminal may be a periodic CSI feedback based on a physical uplink control channel (PUCCH), or may be an aperiodic CSI feedback based on a physical uplink shared channel (PUSCH). For the aperiodic CSI feedback, the network device may trigger the terminal to report CSI corresponding to each CSI process in a certain CSI process set. The CSI process set is configured for the terminal in advance via a high layer signaling, and the triggering step is achieved through downlink control information (DCI). By configuring multiple CSI process sets, the terminal may feed back CSI corresponding to multiple CSI-RSs beamformed by different vertical beamforming vectors. In embodiments of the present disclosure, one CSI feedback configuration group includes one or more CSI feedback configurations, one CSI feedback configuration group may include one or more CSI processes, here the one or more CSI processes correspond to the one or more CSI feedback configurations. On the other hand, in some embodiments of the present disclosure, one CSI feedback configuration group may be defined as one CSI process, and in the case that one feedback configuration group includes multiple CSI feedback configurations, one CSI process may include the multiple CSI feedback configurations; here, the CSI process has a one-to-one correspondence with the CSI feedback configuration group. For convenience in description, in embodiments of the present disclosure it is described based on the case that one CSI feedback configuration group may include one or more CSI processes.

In the embodiments of the present disclosure, the network device indicates a CSI feedback configuration group for CSI feedback to the terminal, and after receiving the CSI feedback configuration group, the terminal determines a CSI feedback approach corresponding to the CSI feedback configuration group. In this way, the terminal achieves CSI measurement and CSI feedback based on the CSI feedback configuration group configured by the network device, and the terminal can support CSI feedback approaches under both an FD-MIMO mode and a non-FD-MIMO mode of the network device.

Figure 2:
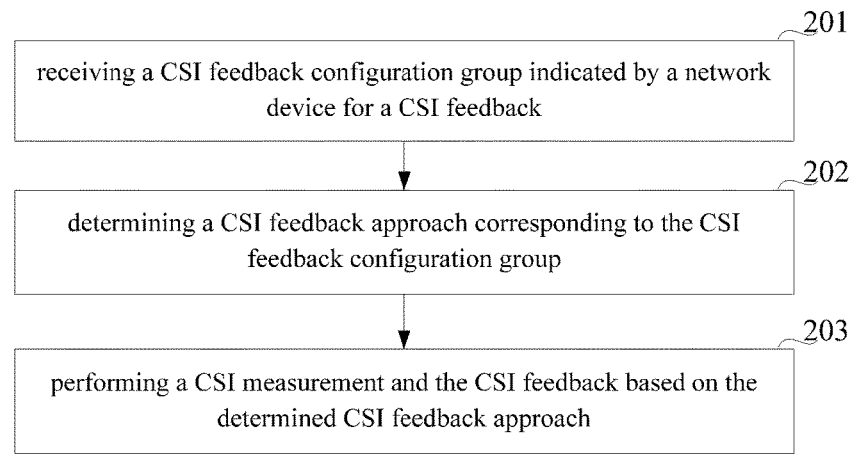
FIG. 2 is flow chart of a channel state information feedback method applied at a terminal side according to some embodiments of the present disclosure.

FIG. 2 illustrates a channel state information (CSI) feedback method at a terminal side according to some embodiments of the present disclosure, which includes the following steps:

step 201, receiving a CSI feedback configuration group indicated by a network device for a CSI feedback;

step 202, determining a CSI feedback approach corresponding to the CSI feedback configuration group; and step 203, performing a CSI measurement and the CSI feedback based on the determined CSI feedback approach.

Indication information in the step 201 through which the network device indicates the CSI feedback configuration group to the terminal for the CSI feedback is usually sent via a high layer signaling, that is to say, the network device may configure the CSI feedback configuration group for the CSI feedback to the terminal via the high layer signaling.

The CSI feedback configuration group may include one or any combination of the following characteristics:

the network device may indicate one or multiple CSI feedback configuration groups for the CSI feedback, for example, the network device may configure three CSI feedback configuration groups;

one CSI feedback configuration group may include one or multiple CSI feedback configurations, one CSI feedback configuration may be one CSI process or a non-zero power channel state information-reference signal (NZP CSI-RS) resource configuration, or other signal configuration for a downlink measurement and the CSI feedback, for example, each CSI feedback configuration group includes four NZP CSI-RS resource configurations;

the CSI feedback configuration group includes configuration information associated with each CSI feedback configuration in the CSI feedback configuration group, for example, the CSI feedback configuration group includes multiple NZP CSI-RS resource configurations and further includes TMR configuration information associated with all of the multiple NZP CSI-RS resource configurations;

in case of multi-carrier, the network device configures one CSI feedback configuration group for each carrier, or configure one CSI feedback configuration group for all carriers;

NZP CSI-RSs included in different CSI feedback configurations may be beamformed by different beamforming vectors.

In the step 202, the feedback approach determined by the terminal may be the first feedback approach or the second feedback approach.

Optionally, the terminal may determine the CSI feedback approach corresponding to the CSI feedback configuration group in the following ways.

In a first way, the CSI feedback approach corresponding to the CSI feedback configuration group is determined based on a quantity of a CSI feedback configuration included in the CSI feedback configuration group.

Optionally in the first way, in the case that the CSI feedback configuration group includes only one CSI feedback configuration, the first feedback approach is determined for the CSI feedback configuration group. In the case that the CSI feedback configuration group includes multiple CSI feedback configurations, the second feedback approach is determined for the CSI feedback configuration group.

In a second way, the CSI feedback approach corresponding to the CSI feedback configuration group is determined based on a quantity of a CSI feedback configuration included in the CSI feedback configuration group and requiring CSI feedback.

Optionally in the second way, in the case that each CSI feedback configuration in the CSI feedback configuration group requires CSI feedback, the first feedback approach is determined for the CSI feedback configuration group; otherwise, the second feedback approach is determined for the CSI feedback configuration group.

Optionally in the second way, the quantity of the CSI feedback configuration included in the CSI feedback configuration group and requiring CSI feedback can be determined in one of the following three ways a1, a2 and a3.

In the way a1, the quantity of the CSI feedback configuration included in the CSI feedback configuration group and requiring CSI feedback is predetermined. For example, it can be predefined according to a standard, or can be predetermined by the network device and the terminal with other manners. In this case, the terminal can determine the quantity of the CSI feedback configuration included in the CSI feedback configuration group and requiring CSI feedback based on the predetermined content.

In the way a2, the quantity of the CSI feedback configuration included in the CSI feedback configuration group and requiring CSI feedback is configured by the network device. Optionally, the quantity of the CSI feedback configuration included in the CSI feedback configuration group and requiring CSI feedback may be indicated to the terminal in advance as a parameter of the CSI feedback configuration group. For example, the CSI feedback configuration group indicated by the network device for CSI feedback further includes the quantity of the CSI feedback configuration included in the CSI feedback configuration group and requiring CSI feedback. In this case, the terminal may determine the quantity of the CSI feedback configuration included in the CSI feedback configuration group and requiring CSI feedback based on information configured by the network device.

In the way a3, the quantity of the CSI feedback configuration included in the CSI feedback configuration group and requiring CSI feedback is indicated by the network device via indication information included in a triggering signaling of an aperiodic CSI feedback. For example, the quantity of the CSI feedback configuration included in the CSI feedback configuration group and requiring CSI feedback is indicated by 1-bit information in the triggering signaling.

In a third way, the CSI feedback approach corresponding to the CSI feedback configuration group is determined based on feedback approach indication information included in a received triggering signaling of an aperiodic CSI feedback. For example, it is indicated through 1-bit information in the triggering signaling whether the CSI feedback approach corresponding to the CSI feedback configuration group is the first feedback approach or the second feedback approach.

In a fourth way, the CSI feedback approach corresponding to the CSI feedback configuration group is determined based on feedback approach indication information corresponding to the CSI feedback configuration group. Here, each CSI feedback configuration group is configured with corresponding feedback approach indication information.

Optionally, the feedback approach indication information corresponding to the CSI feedback configuration group is included in the CSI feedback configuration group. That is to say, the feedback approach corresponding to the CSI feedback configuration group can be indicated to the terminal in advance as a parameter of the CSI feedback configuration group, and the CSI feedback configuration group indicated by the network device for CSI feedback further includes the feedback approach corresponding to the CSI feedback configuration group.

In a fifth way, the CSI feedback approach corresponding to the CSI feedback configuration group is determined based on a feedback mode of the CSI feedback configuration group, where the feedback mode of the CSI feedback configuration group includes a periodic CSI feedback and an aperiodic CSI feedback.

Optionally in the fifth way, in the case that the feedback mode of the CSI feedback configuration group is the periodic CSI feedback, the first feedback approach is determined as the CSI feedback approach corresponding to the CSI feedback configuration group. In the case that the feedback mode of the CSI feedback configuration group is the aperiodic CSI feedback, the second feedback approach is determined as the CSI feedback approach corresponding to the CSI feedback configuration group.

Among the above five ways in determining the CSI feedback approach corresponding to the CSI feedback configuration group, the first way, the second way and the fifth way are implicit indicating ways, while the third way and the fourth way are explicit indicating ways.

In the step 303, in the case that the CSI feedback approach corresponding to the CSI feedback configuration group is determined to be the first feedback approach, the terminal may feed back, according to the first feedback approach, CSI obtained through a measurement based on each CSI feedback configuration in the CSI feedback configuration group. In the case that the CSI feedback approach corresponding to the CSI feedback configuration group is determined to be the second feedback approach, the terminal may select an optimum CSI feedback configuration from the CSI feedback configuration group and feed back CSI obtained through a measurement based on the optimum CSI feedback configuration and location information of the optimum CSI feedback configuration in the CSI feedback configuration group, according to the second feedback approach. The terminal may adopt the periodic CSI feedback or the aperiodic CSI feedback.

In the case that the terminal determines to perform CSI measurement and CSI feedback using the second feedback approach, the terminal may select the optimum CSI feedback configuration from the CSI feedback configuration group with any of the following ways b1, b2 and b3.

In the way b1, a reference signal receiving power (RSRP) is measured for each CSI feedback configuration in the CSI feedback configuration group, and a CSI feedback configuration corresponding to a largest RSRP in one or multiple RSRPs determined through the measurement is selected as the optimum CSI feedback configuration in the CSI feedback configuration group.

In the way b2, a channels quality indication (CQI) is estimated for each CSI feedback configuration in the CSI feedback configuration group, and a CSI feedback configuration corresponding to a largest CQI in one or multiple CQIs determined through the estimation is selected as the optimum CSI feedback configuration in the CSI feedback configuration group.

In the way b3, a CSI measurement is performed on each CSI feedback configuration in the CSI feedback configuration group and a transport block size (TBsize) corresponding to each CSI feedback configuration is obtained based on the CSI measurement result, then a CSI feedback configuration corresponding to a largest TBsize in one or multiple obtained TBsizes is selected as the optimum CSI feedback configuration in the CSI feedback configuration group.

In the case that the terminal adopts the second feedback approach, when the terminal feeds back the location information of the optimum CSI feedback configuration in the CSI feedback configuration group using the second feedback approach, the location information may be represented in various ways. Two preferred representation ways are described as follows.

In a first location representation way, the location information of the optimum CSI feedback configuration in the CSI feedback configuration group refers to an index of the optimum CSI feedback configuration in the CSI feedback configuration group. That is, the terminal reports the index of the optimum CSI feedback configuration in the CSI feedback configuration group.

In a second location representation way, a bitmap manner is utilized. Each CSI feedback configuration group corresponds to a location list, and each CSI feedback configuration in the CSI feedback configuration group corresponds to one location in the location list, that is, each CSI feedback configuration in the CSI feedback configuration group corresponds to one bit in the location list. The location information of the optimum CSI feedback configuration in the CSI feedback configuration group refers to a value of a corresponding bit where the optimum CSI feedback configuration is located in the location list corresponding to the CSI feedback configuration group. For example, the value of the bit where the optimum CSI feedback configuration is located in the location list corresponding to the CSI feedback configuration group is set as 1 and other bits in the location list are set as 0, then the location information of the optimum CSI feedback configuration in the CSI feedback configuration group can be determined based on the values of the bits of the location list.

For periodic CSI feedback, in the case that the determined CSI feedback approach is the second feedback approach, the optimum CSI feedback configuration needs to be selected from the CSI feedback configuration group, the CSI obtained through a measurement based on the optimum CSI feedback configuration in the CSI feedback configuration group is fed back periodically, and the location information of the optimum CSI feedback configuration in the CSI feedback configuration group is fed back periodically. The CSI reported by the terminal includes one or any combination of a rank indicator (RI), a pre-coding matrix indicator (PMI) and a CQI.

In order to ensure that the RI included in the CSI fed back under the second feedback approach can be timely updated according to newest location information that is fed back, such that adverse effects on FD-MIMO performance due to mismatching between the RI that is fed back and the location information that is fed back can be avoided. According to some embodiments of the present disclosure, the following preferred schemes are given for the second feedback approach.

Optionally, in the case that the determined feedback approach is the second feedback approach and the CSI that is obtained through the measurement based on the optimum CSI feedback configuration in the CSI feedback configuration group and fed back includes the RI, a feedback period of the location information is N times of a feedback period of the RI and a PUCCH resource location of the location information is identical to a PUCCH resource location of the RI. Here, N is a positive integer.

Specifically, in the case that N equals to 1, that is, the PUCCH resource location of the location information is completely identical to the PUCCH resource location of the RI, the location information that is fed back under the second feedback approach and the RI that is fed back under the second feedback approach are always fed back together. In the case that N does not equal to 1, for example N equals to 4, the feedback period of the RI included in the CSI fed back under the second feedback approach is represented by T, then the feedback period of the location information under the second feedback approach is 4T. That is, between two times of feeding back the location information and the RI together, there are three times of feeding back the RI only.

Under the second feedback approach, the location information must be fed back together with the RI, while the RI can be fed back together with the location information or fed back alone.

Optionally, in the case that the location information and the RI are fed back in one subframe, the location information and the RI are first joint-coded or cascaded and then fed back.

Specifically, when feeding back the RI and the location information in one subframe, for saving signaling cost, the location information and the RI need to be joint-coded or cascaded to obtain new indication information corresponding to the location information and the RI that need to be fed back, for example, to obtain a new code; then, the new indication information is fed back. After receiving the new indication information, the network device may determine the location information and the RI corresponding to the new indication information based on a joint coding rule or a cascading rule.

Optionally, when feeding back the location information and the RI in one subframe, RI is obtained through a measurement based on an optimum CSI feedback configuration corresponding to the location information fed back in the subframe. In this way, it is ensured that the RI and the location information fed back in the same subframe match with each other and the FD-MIMO performance may not be adversely affected.

Optionally, when feeding back the location information and the RI in different subframes, the RI is obtained through a CSI measurement based on an optimum CSI feedback configuration corresponding to location information that is most recently fed back. Specifically, when feeding backing the RI alone between two times of feeding backing the location information, the RI needs to be based on the location information that is most recently fed back; "the location information that is most recently fed back" refers to the location information fed back at a time point closest to a current time point feeding back the RI, that is, the location information that is most newly fed back. The RI is obtained through a CSI measurement based on the optimum CSI feedback configuration corresponding to the location information that is most newly fed back. In this way, it is ensured that when feeding backing the RI and the location information in different subframes, the RI that is fed back matches with the location information that is most newly fed back, thereby avoiding adverse effects on FD-MIMO performance.

Optionally, in the case that the determined feedback approach is the second feedback approach and the CSI that is obtained through a measurement based on the optimum CSI feedback configuration in the CSI feedback configuration group and then fed back includes at least one of the PMI and the CQI, the at least one of the PMI and the CQI is obtained through a CSI measurement based on the optimum CSI feedback configuration corresponding to the location information that is most recently fed back.

Specifically, when feeding back the PMI and the location information in different subframes, or feeding back the CQI and the location information in different subframes or feeding back the PMI, the CQI and the location information in different subframes, the PMI and/or the CQI that is fed back is obtained through a measurement based on the optimum CSI feedback configuration corresponding to the location information that is most recently fed back. When feeding back the PMI and the location information in one subframe, or feeding back the CQI and the location information in one subframe or feeding back the PMI, the CQI and the location information in one subframe, the PMI and/or the CQI that is fed back is obtained through a measurement based on the optimum CSI feedback configuration corresponding to the location information fed back in the subframe.

In addition, in the case that information in the CSI other than the RI, e.g., the PMI and/or the CQI, conflicts with the location information to be fed back during a feedback process, some information needs to be dropped. Here, the information in the CSI other than the RI can be dropped, while the RI in the CSI and the location information are fed back. For example, in case of feeding back the RI, the location information and at least one of the PMI and the CQI in one subframe, the subframe cannot carry so much information and some information needs to be dropped. At this time, information other than the RI and the location information, i.e., the at least one of the PMI and the CQI is to be dropped.

The above embodiments of the present disclosure provide preferred schemes for achieving the periodic CSI feedback under the second feedback approach. With those schemes, the RI that is periodically fed back under the second feedback approach matches with the location information that is most recently fed back, which avoids adverse effects on the FD-MIMO performance.

After the step 203, the network device receives the CSI fed back from the terminal, performs a downlink data transmission based on the CSI fed back from the terminal, or updates CSI feedback configuration information based on the CSI fed back from the terminal.

In view of the above description, on one hand, the network device can indicate a feedback approach to be utilized by the terminal to the terminal in an explicit indicating way or an implicit indicating way through the CSI feedback configuration group; after receiving the CSI feedback configuration group, the terminal determines a CSI feedback approach corresponding to the CSI feedback configuration group is a CSI feedback approach supported by the network device; hence, the terminal can perform CSI measurement and CSI feedback based on the CSI feedback approach supported by the network device.

On another hand, the terminal can support CSI feedback approaches under both an FD-MIMO mode and a non-FD-MIMO mode of the network device; consequently, the network device can determine an optimum vertical beamforming vector based on the CSI that is fed back and the perform beamforming using the optimum vertical beamforming vector. For example, according to some embodiments of the present disclosure, an optimum NZP CSI-RS can be selected from each of multiple groups using an aperiodic CSI feedback, and the optimum NZP CSI-RS configurations selected from the multiple groups are applied to a subsequent periodic or aperiodic CSI feedback, thereby supporting CSI feedback under a combined scene of CoMP and FD-MIMO.

On further another hand, the foregoing embodiments of the present disclosure have good backward compatibility. Optionally, in the case that the CSI feedback configuration group includes only one CSI feedback configuration or the terminal feeds back, according to the first feedback approach, the CSI obtained through a measurement based on each CSI configuration in the CSI feedback configuration group, a CSI feedback approach utilized by the terminal in the embodiments of the present disclosure is identical to a feedback approach utilized in related technology.

The method according to foregoing embodiments of the present disclosure is described based on the following two embodiments.

First Embodiment

The network device indicates two CSI feedback configuration groups for a periodic CSI feedback to the terminal via a high layer signaling, each CSI feedback configuration group includes one or multiple NZP CSI-RS configurations and one IMR configuration. Different NZP CSI-RSs in one CSI feedback configuration group adopt different vertical beamforming vectors to perform beamforming.

After receiving the two CSI feedback configuration groups, the terminal determines a feedback approach based on a quantity of a NZP CSI-RS in each CSI feedback configuration group.

In the case that one configuration group includes only one NZP CSI-RS, the terminal performs a CSI measurement and a CSI reporting based on the NZP CSI-RS and the IMR configuration in the configuration group. The CSI reported by the terminal includes any one or any combination of an RI, a PMI and a CQI.

In the case that one configuration group includes multiple NZP CSI-RSs, the terminal needs to select an optimum NZP CSI-RS from the multiple NZP CSI-RSs for CSI measurement. For example, the terminal may select the optimum NZP CSI-RS based on an RSRP measured for each NZP CSI-RS, perform the CSI measurement based on the selected NZP CSI-RS and the IMR configuration in the configuration group, feed back any one or any combination of the RI, the PMI and the CQI that are obtained through the CSI measurement, and may further report an index of the selected NZP CSI-RS in all NZP CSI-RSs of the configuration group.

Second Embodiment

The network device indicates three CSI feedback configuration groups for an aperiodic CSI feedback to the terminal via a high layer signaling, each CSI feedback configuration group includes one or multiple NZP CSI-RS configurations. Each of a first CSI feedback configuration group and a second CSI feedback configuration group corresponds to one transmitting point, and different NZP CSI-RSs in one CSI feedback configuration group adopt different vertical beamforming vectors to perform beamforming. In a third CSI feedback configuration group, different NZP CSI-RS resource configurations correspond to different transmitting points.

The network device configures corresponding feedback approaches for all CSI feedback configuration groups simultaneously. The first CSI feedback configuration group and the second CSI feedback configuration group adopt the second feedback approach while the third CSI feedback configuration group adopts the first feedback approach. The feedback approach for each CSI feedback configuration group is indicated by a 1-bit signaling, and the feedback approach is indicated to the terminal together with configuration information for the corresponding CSI feedback configuration group.

The network triggers, through a DCI, the terminal to perform the aperiodic CSI feedback. A triggering signaling includes two bits of information, and indicated contents are reflected in Table 1:

TABLE 1 contents indicated by two bits of the triggering signaling

| Two bits of information | Contents indicated by the two bits |
|---|---|
| 00 | feeding back the CSI obatined through a CSI measurement based on the first CSI feedback configuration group |
| 01 | feeding back the CSI obatined through a CSI measurement based on the second CSI feedback configuration group |
| 10 | feeding back the CSI obatined through a CSI measurement based on the third CSI feedback configuration group |
| 11 | not performing aperiodic CSI feedback |

Upon receiving the triggering signaling, the terminal performs a CSI measurement and a CSI feedback for each CSI feedback configuration group. Ways for performing the CSI measurement and the CSI feedback for one CSI feedback configuration group are determined based on a feedback approach pre-configured for the CSI feedback configuration group. For example, the network device triggers, through two-bit information "10", the terminal to feed back the CSI obtained through a CSI measurement based on the third CSI feedback configuration group; the terminal needs to perform CSI measurement based on each NZP CSI-RS in the third CSI feedback configuration group and feed back CSI obtained through CSI measurement based on the third CSI feedback configuration group.

The network device receives the CSI aperiodically fed back by the terminal, and performs a downlink data transmission based on the CSI fed back from the terminal or updates CSI feedback configuration information based on the CSI fed back from the terminal. For example, the network device triggers the terminal to report an index of an optimum NZP CSI-RS configuration in the first CSI feedback configuration group and an index of an optimum NZP CSI-RS configuration in the second CSI feedback configuration group, use the optimum NZP CSI-RS configuration in the first CSI feedback configuration group and the optimum NZP CSI-RS configuration in the second CSI feedback configuration group as CSI feedback configurations in the third CSI feedback configuration group, such that the terminal may only feed back the CSI corresponding to the optimum NZP CSI-RS configurations in respective transmitting points in subsequent process.

Third Embodiment

Figure 2A:
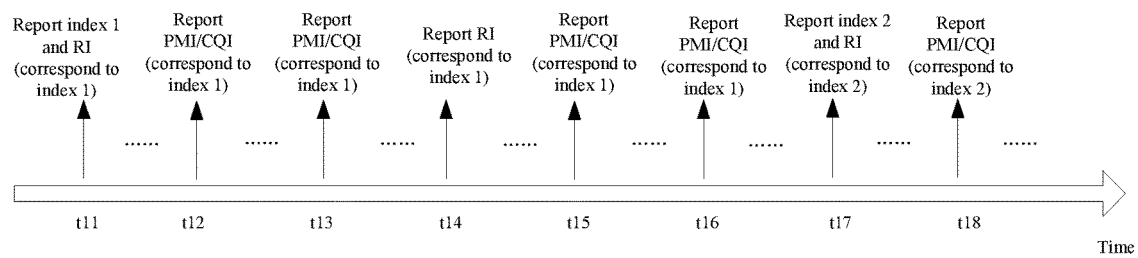
FIG. 2a schematically shows a time sequence of feeding back location information and CSI by a terminal according to some embodiments of the present disclosure.

FIG. 2a schematically shows a time sequence of feeding back location information and CSI by a terminal according to some embodiments of the present disclosure. Detailed description is given based on FIG. 2a. A base station indicates, via a high layer signaling, a CSI feedback configuration group for a periodic CSI feedback to the terminal. In the embodiments of the present disclosure, the CSI feedback configuration group can be defined as a set of CSI feedback configurations. The CSI feedback configuration group includes multiple NZP CSI-RS configuration and one IMR configuration. Different NZP CSI-RSs adopt different vertical beamforming vectors to perform beamforming.

After receiving the CSI feedback configuration group, the terminal selects one optimum NZP CSI-RS from the multiple NZP CSI-RSs in the CSI feedback configuration group for CSI measurement. For example, the terminal may select the optimum NZP CSI-RS based on an RSRP measured for each NZP CSI-RS, and performs the CSI measurement based on the selected NZP CSI-RS and the IMR configuration in the configuration group to obtain an RI, a PMI and a CQI.

The terminal may report location information (e.g., an index) of the selected NZP CSI-RS in all NZP CSI-RSs in the CSI feedback configuration group to the base station together with the RI obtained based on the selected optimum NZP CSI-RS. As shown in FIG. 2a, an index 1 and the RI are reported together at time t11 in an axis indicating the time, and an index 2 and the RI are reported together at time t17. In addition, after reporting the index 1 and before reporting the index 2, the terminal successively reports at least one of the PMI and the CQI at time t12 and time t13, reports the RI only at time t14 and reports at least one of the PMI and the CQI at time t15 and time t16. Each of the at least one of the PMI and the CQI and the RI reported between time t11 and time t17 is obtained through a measurement based on the optimum CSI feedback configuration in the CSI feedback configuration group corresponding to the index 1. After reporting the index 2 at time t17, all information in the CSI subsequently reported by the terminal is obtained through a measurement based on the optimum CSI feedback configuration in the CSI feedback configuration group corresponding to the index 2. As shown in FIG. 2a, the at least one of the PMI and the CQI reported at time t18 is obtained through a measurement based on the optimum CSI feedback configuration in the CSI feedback configuration group corresponding to the index 2.

Fourth Embodiment

Figure 2B:
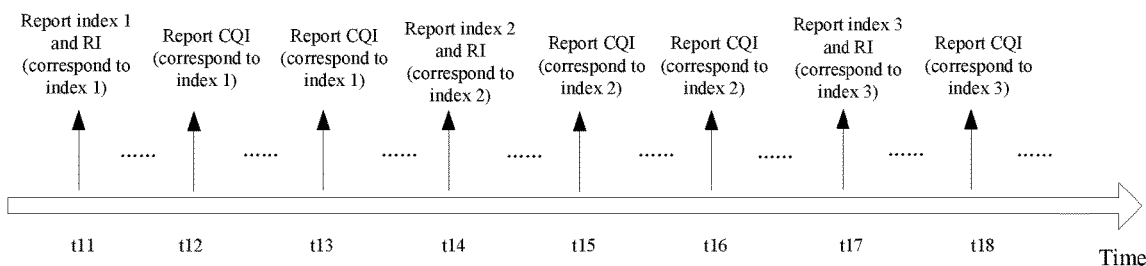
FIG. 2b schematically shows a time sequence of feeding back location information and CSI by a terminal according to some embodiments of the present disclosure.

FIG. 2b schematically shows a time sequence of feeding back location information and CSI by a terminal according to some embodiments of the present disclosure. Detailed description is given based on FIG. 2b. A base station indicates, via a high layer signaling, a CSI feedback configuration group for a periodic CSI feedback to the terminal. The CSI feedback configuration group includes multiple CSI processes. Each CSI process includes one NZP CSI-RS configuration and one IMR configuration.

After receiving the CSI feedback configuration group, the terminal selects one optimum CSI process from the multiple CSI processes in the CSI feedback configuration group for CSI measurement. For example, the terminal may estimate a CQI for each CSI process, selects the CSI process corresponding to a largest CQI as the optimum CSI process and performs the CSI measurement based on the selected optimum CSI process to obtain an RI and the CQI.

The terminal may report location information (e.g., an index) of the selected CSI process in all CSI processes in the CSI feedback configuration group to the base station together with the RI obtained based on the selected optimum CSI process. As shown in FIG. 2b, an index 1 and the RI are reported together at time t21, an index 2 and the RI are reported together at time t24, an index 3 and the RI are reported together at time t27. In addition, after reporting the index 1 and before reporting the index 2, the terminal reports the CQI at time t22 and time t23 successively. Each CQI reported between time t21 and time t24 is obtained through a measurement based on the optimum CSI process in the CSI feedback configuration group corresponding to the index 1. In addition, after reporting the index 2 and before reporting the index 3, the terminal reports the CQI at time t25 and time t26 successively. Each CQI reported between time t24 and time t27 is obtained through a measurement based on the optimum CSI process in the CSI feedback configuration group corresponding to the index 2. After reporting the index 3 at time t27, all information in the CSI subsequently reported by the terminal is obtained through a measurement based on the optimum CSI process in the CSI feedback configuration group corresponding to the index 3; for example, the CQI reported at time t28 as shown in FIG. 2b is obtained through a measurement based on the optimum CSI process in the CSI feedback configuration group corresponding to the index 3.

In view of the above description, the network device indicates the CSI feedback configuration group for CSI feedback to the terminal, and after receiving the CSI feedback configuration group, the terminal determines a CSI feedback approach corresponding to the CSI feedback configuration group. In this way, the terminal performs CSI measurement and CSI feedback based on the CSI feedback configuration group configured by the network device, the terminal can support CSI feedback approaches under both an FD-MIMO mode and a non-FD-MIMO mode of the network device.

Figure 3:
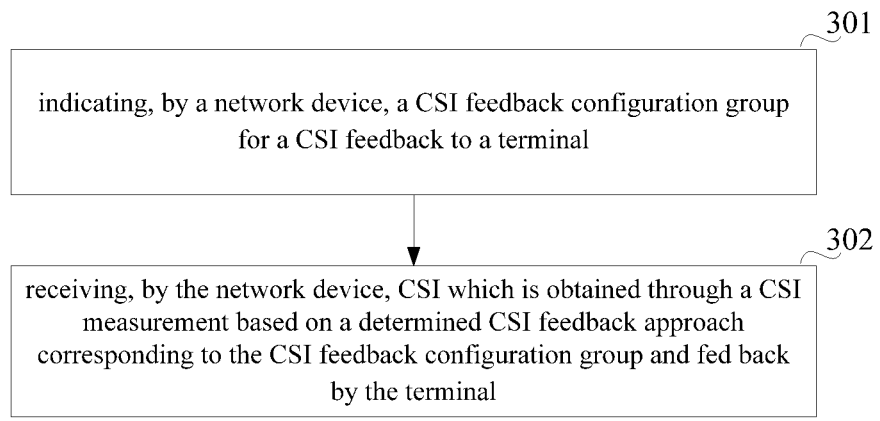
FIG. 3 shows a channel state information feedback method at a network device side according to some embodiments of the present disclosure.

Based on similar technical concept, FIG. 3 shows a channel state information (CSI) feedback method at a network device side according to some embodiments of the present disclosure, which includes the following steps:

step 301, indicating, by a network device, a CSI feedback configuration group for a CSI feedback to a terminal;

step 302, receiving, by the network device, CSI which is obtained through a CSI measurement based on a determined CSI feedback approach corresponding to the CSI feedback configuration group and fed back by the terminal.

Indication information in the step 301 through which the network device indicates the CSI feedback configuration group to the terminal for the CSI feedback is usually sent via a high layer signaling, that is to say, the network device may configure the CSI feedback configuration group for the CSI feedback to the terminal via the high layer signaling. The CSI feedback configuration group may include some preferred characteristics, those characteristics are detailed in foregoing descriptions and are therefore not repeated herein.

Optionally, in the step 302, the CSI feedback approach includes a first feedback approach and a second feedback approach. For the first feedback approach, CSI obtained through a measurement based on each CSI feedback configuration in a CSI feedback configuration group is fed back. For the second feedback approach, an optimum CSI feedback configuration is selected from the CSI feedback configuration group, then CSI obtained through a measurement based on the optimum CSI feedback configuration in the CSI feedback configuration group and location information of the optimum CSI feedback configuration in the CSI feedback configuration group are fed back.

In the second feedback approach, the location information of the optimum CSI feedback configuration in the CSI feedback configuration group may be represented in various ways, and two preferred representation ways are described as follows.

In a first location representation way, the location information of the optimum CSI feedback configuration in the CSI feedback configuration group refers to an index of the optimum CSI feedback configuration in the CSI feedback configuration group.

In a second location representation way, each CSI feedback configuration group corresponds to a location list, and each CSI feedback configuration in the CSI feedback configuration group corresponds to one location in the location list. The location information of the optimum CSI feedback configuration in the CSI feedback configuration group refers to a value of a corresponding bit where the optimum CSI feedback configuration is located in the location list corresponding to the CSI feedback configuration group.

In the step 302, ways in which the terminal may determine the CSI feedback approach corresponding to the CSI feedback configuration group are detailed in foregoing description and are merely briefly noted herein.

In a first way, the CSI feedback approach corresponding to the CSI feedback configuration group is determined by the terminal based on a quantity of a CSI feedback configuration included in the CSI feedback configuration group.

In a second way, the CSI feedback approach corresponding to the CSI feedback configuration group is determined by the terminal based on a quantity of a CSI feedback configuration included in the CSI feedback configuration group and requiring CSI feedback.

Optionally in the second way, in the case that each CSI feedback configuration in the CSI feedback configuration group requires CSI feedback, the first feedback approach is determined for the CSI feedback configuration group; otherwise, the second feedback approach is determined for the CSI feedback configuration group.

Optionally in the second way, the quantity of CSI feedback configuration included in the CSI feedback configuration group and requiring CSI feedback can be determined in one of the following three ways a1, a2 and a3.

In the way a1, the quantity of CSI feedback configuration included in the CSI feedback configuration group and requiring CSI feedback is predetermined. For example, it can be predefined according to a standard, or can be predetermined by the network device and the terminal with other manners. In this case, the terminal can determine the quantity of CSI feedback configuration included in the CSI feedback configuration group and requiring CSI feedback based on the predetermined content.

In the way a2, the quantity of CSI feedback configuration included in the CSI feedback configuration group and requiring CSI feedback is configured by the network device. Optionally, the quantity of CSI feedback configuration included in the CSI feedback configuration group and requiring CSI feedback may be indicated to the terminal in advance as a parameter of the CSI feedback configuration group. For example, the CSI feedback configuration group indicated by the network device for CSI feedback further includes the quantity of CSI feedback configuration included in the CSI feedback configuration group and requiring CSI feedback. In this case, the terminal may determine the quantity of CSI feedback configuration included in the CSI feedback configuration group and requiring CSI feedback based on information configured by the network device.

In the way a3, the quantity of CSI feedback configuration included in the CSI feedback configuration group and requiring CSI feedback is indicated by the network device via indication information included in a triggering signaling of an aperiodic CSI feedback. For example, the quantity of CSI feedback configuration included in the CSI feedback configuration group and requiring CSI feedback is indicated by 1-bit information in the triggering signaling.

In a third way, the CSI feedback approach corresponding to the CSI feedback configuration group is determined based on feedback approach indication information included in a received triggering signaling of an aperiodic CSI feedback.

In a fourth way, the CSI feedback approach corresponding to the CSI feedback configuration group is determined by the terminal based on feedback approach indication information corresponding to the CSI feedback configuration group. Here, each CSI feedback configuration group is configured with corresponding feedback approach indication information. Optionally, the CSI feedback configuration group indicated by the network device for CSI feedback further includes the feedback approach corresponding to the CSI feedback configuration group.

Optionally, the feedback approach indication information corresponding to the CSI feedback configuration group is included in the CSI feedback configuration group. That is to say, the feedback approach corresponding to the CSI feedback configuration group can be indicated to the terminal in advance as a parameter of the CSI feedback configuration group, and the CSI feedback configuration group indicated by the network device for CSI feedback further includes the feedback approach corresponding to the CSI feedback configuration group.

In a fifth way, the CSI feedback approach corresponding to the CSI feedback configuration group is determined based on a feedback mode of the CSI feedback configuration group, where the feedback mode of the CSI feedback configuration group includes a periodic CSI feedback and an aperiodic CSI feedback. Optionally, the network device can configure through a signaling whether the terminal performs the periodic CSI feedback or the aperiodic CSI feedback.

Optionally in the fifth way, in the case that the feedback mode of the CSI feedback configuration group is the periodic CSI feedback, the first feedback approach is determined as the CSI feedback approach corresponding to the CSI feedback configuration group. In the case that the feedback mode of the CSI feedback configuration group is the aperiodic CSI feedback, the second feedback approach is determined as the CSI feedback approach corresponding to the CSI feedback configuration group.

Optionally, in the case that the determined feedback approach is the second feedback approach and the CSI that is obtained through the measurement based on the optimum CSI feedback configuration in the CSI feedback configuration group and fed back includes a rank indicator (RI), a feedback period of the location information is N times of a feedback period of the RI and a PUCCH resource location of the location information is identical to a PUCCH resource location of the RI. Here, N is a positive integer.

Optionally, in the case that the location information and the RI are fed back in one subframe, the location information and the RI are first joint-coded or cascaded and then fed back.

Optionally, when feeding back the location information and the RI in one subframe, the RI is obtained through a measurement based on an optimum CSI feedback configuration corresponding to the location information fed back in the subframe.

Optionally, when feeding back the location information and the RI in different subframes, the RI is obtained through a CSI measurement based on an optimum CSI feedback configuration corresponding to location information that is most recently fed back.

Optionally, in the case that the determined feedback approach is the second feedback approach and the CSI that is obtained through a measurement based on the optimum CSI feedback configuration in the CSI feedback configuration group and then fed back includes at least one of a pre-coding matrix indicator (PMI) and a channels quality indication (CQI), the at least one of the PMI and the CQI is obtained through a CSI measurement based on the optimum CSI feedback configuration corresponding to the location information that is most recently fed back.

In the step 302, after receiving the CSI fed back from the terminal, the network device performs a downlink data transmission based on the CSI fed back from the terminal, or updates CSI feedback configuration information based on the CSI fed back from the terminal.

In view of the above description, the network device indicates the CSI feedback configuration group for CSI feedback to the terminal, and after receiving the CSI feedback configuration group, the terminal determines a CSI feedback approach corresponding to the CSI feedback configuration group. In this way, the terminal performs CSI measurement and CSI feedback based on the CSI feedback configuration group configured by the network device, the terminal can support CSI feedback approaches under both an FD-MIMO mode and a non-FD-MIMO mode of the network device.

Figure 4:
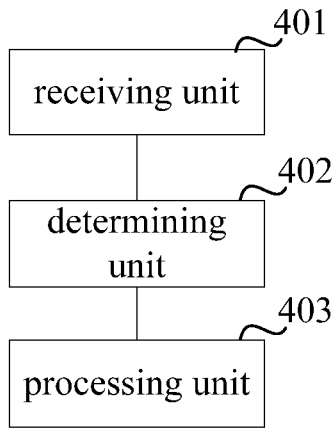
FIG. 4 is a schematic structural diagram of a terminal according to some embodiments of the present disclosure.

Based on similar technical concept, FIG. 4 schematically shows a terminal according to some embodiments of the present disclosure for executing steps of the foregoing method. As shown in FIG. 4, the terminal according to the embodiments of the present disclosure includes a receiving unit 401, a determining unit 402 and a processing unit 403.

The receiving unit 401 is used to receive a channel state information (CSI) feedback configuration group indicated by a network device for a CSI feedback.

The determining unit 402 is used to determine a CSI feedback approach corresponding to the CSI feedback configuration group.

The processing unit 403 is used to perform a CSI measurement and the CSI feedback based on the determined CSI feedback approach.

Optionally, the CSI feedback approach may include a first feedback approach and a second feedback approach. For the first feedback approach, CSI obtained through a measurement based on each CSI feedback configuration in a CSI feedback configuration group is fed back. For the second feedback approach, an optimum CSI feedback configuration is selected from the CSI feedback configuration group, then CSI obtained through a measurement based on the optimum CSI feedback configuration in the CSI feedback configuration group and location information of the optimum CSI feedback configuration in the CSI feedback configuration group are fed back.

Optionally, the processing unit 403 is used to measure a reference signal receiving power (RSRP) for each CSI feedback configuration in the CSI feedback configuration group and select a CSI feedback configuration corresponding to a largest RSRP in one or multiple RSRPs determined through the measurement as the optimum CSI feedback configuration in the CSI feedback configuration group; or the processing unit 403 is used to estimate a channels quality indication (CQI) for each CSI feedback configuration in the CSI feedback configuration group and select a CSI feedback configuration corresponding to a largest CQI in one or multiple CQIs determined through the estimation as the optimum CSI feedback configuration in the CSI feedback configuration group; or the processing unit 403 is used to perform a CSI measurement on each CSI feedback configuration in the CSI feedback configuration group, obtain a transport block size (TBsize) corresponding to each CSI feedback configuration based on a result of the CSI measurement, and select a CSI feedback configuration corresponding to a largest TBsize in one or multiple obtained TBsizes as the optimum CSI feedback configuration in the CSI feedback configuration group.

Optionally, the location information of the optimum CSI feedback configuration in the CSI feedback configuration group refers to an index of the optimum CSI feedback configuration in the CSI feedback configuration group, or refers to a value of a corresponding bit where the optimum CSI feedback configuration is located in a location list corresponding to the CSI feedback configuration group, where each CSI feedback configuration in the CSI feedback configuration group corresponds to one location in the location list.

Optionally, in the case that the determined feedback approach is the second feedback approach and the CSI that is obtained through the measurement based on the optimum CSI feedback configuration in the CSI feedback configuration group and fed back includes a rank indicator (RI), a feedback period of the location information is N times of a feedback period of the RI and a PUCCH resource location of the location information is identical to a PUCCH resource location of the RI. Here, N is a positive integer.

Optionally, in the case that the location information and the RI are fed back in one subframe, the location information and the RI are first joint-coded or cascaded and then fed back.

Optionally, when feeding back the location information and the RI in one subframe, RI is obtained through a measurement based on an optimum CSI feedback configuration corresponding to the location information fed back in the subframe.

Optionally, when feeding back the location information and the RI in different subframes, the RI is obtained through a CSI measurement based on an optimum CSI feedback configuration corresponding to location information that is most recently fed back.

Optionally, in the case that the determined feedback approach is the second feedback approach and the CSI that is obtained through a measurement based on the optimum CSI feedback configuration in the CSI feedback configuration group and then fed back includes at least one of a pre-coding matrix indicator (PMI) and a channels quality indication (CQI), the at least one of the PMI and the CQI is obtained through a CSI measurement based on the optimum CSI feedback configuration corresponding to the location information that is most recently fed back.

Optionally, the processing unit 402 is used to: determine the CSI feedback approach corresponding to the CSI feedback configuration group based on a quantity of a CSI feedback configuration included in the CSI feedback configuration group; or determine the CSI feedback approach corresponding to the CSI feedback configuration group based on a quantity of a CSI feedback configuration included in the CSI feedback configuration group and requiring CSI feedback; or determine the CSI feedback approach corresponding to the CSI feedback configuration group based on feedback approach indication information included in a received triggering signaling of an aperiodic CSI feedback; or determine the CSI feedback approach corresponding to the CSI feedback configuration group based on feedback approach indication information corresponding to the CSI feedback configuration group, each CSI feedback configuration group being configured with corresponding feedback approach indication information; or determine the CSI feedback approach corresponding to the CSI feedback configuration group based on a feedback mode of the CSI feedback configuration group, the feedback mode of the CSI feedback configuration group including a periodic CSI feedback and an aperiodic CSI feedback.

Optionally, the processing unit 402 is used to determine, in the case that the CSI feedback configuration group includes only one CSI feedback configuration, the first feedback approach to be applied for the CSI feedback configuration group, where the first feedback approach refers to feed back CSI corresponding to each CSI feedback configuration in the CSI feedback configuration group; or to determine, in the case that the CSI feedback configuration group includes multiple CSI feedback configurations, the second feedback approach to be applied for the CSI feedback configuration group, where the second feedback approach refers to feed back CSI corresponding to an optimum CSI feedback configuration in the CSI feedback configuration group and location information of the optimum CSI feedback configuration in the CSI feedback configuration group.

Optionally, the processing unit 402 is used to determine, in the case that each CSI feedback configuration in the CSI feedback configuration group requires CSI feedback, the first feedback approach to be applied for the CSI feedback configuration group; otherwise, determine the second feedback approach to be applied for the CSI feedback configuration group. The first feedback approach refers to feed back CSI corresponding to each CSI feedback configuration in the CSI feedback configuration group. The second feedback approach refers to feed back CSI corresponding to an optimum CSI feedback configuration in the CSI feedback configuration group and location information of the optimum CSI feedback configuration in the CSI feedback configuration group.

Optionally, the quantity of the CSI feedback configuration included in the CSI feedback configuration group and requiring CSI feedback is predetermined; or the quantity of the CSI feedback configuration included in the CSI feedback configuration group and requiring CSI feedback is configured by the network device; or the quantity of the CSI feedback configuration included in the CSI feedback configuration group and requiring CSI feedback is indicated by the network device via indication information included in a triggering signaling of an aperiodic CSI feedback.

Optionally, the feedback approach indication information corresponding to the CSI feedback configuration group is included in the CSI feedback configuration group.

Optionally, the processing unit 402 is used to determine, in the case that the feedback mode of the CSI feedback configuration group is the periodic CSI feedback, the first feedback approach as the CSI feedback approach corresponding to the CSI feedback configuration group, where the first feedback approach refers to feed back CSI corresponding to each CSI feedback configuration in the CSI feedback configuration group; or determine, in the case that the feedback mode of the CSI feedback configuration group is the aperiodic CSI feedback, the second feedback approach as the CSI feedback approach corresponding to the CSI feedback configuration group, where the second feedback approach refers to feed back CSI corresponding to an optimum CSI feedback configuration in the CSI feedback configuration group and location information of the optimum CSI feedback configuration in the CSI feedback configuration group.

In view of the above description, the network device indicates the CSI feedback configuration group for CSI feedback to the terminal, and after receiving the CSI feedback configuration group, the terminal determines a CSI feedback approach corresponding to the CSI feedback configuration group. In this way, the terminal performs CSI measurement and CSI feedback based on the CSI feedback configuration group configured by the network device, the terminal can support CSI feedback approaches under both an FD-MIMO mode and a non-FD-MIMO mode of the network device.

Figure 5:
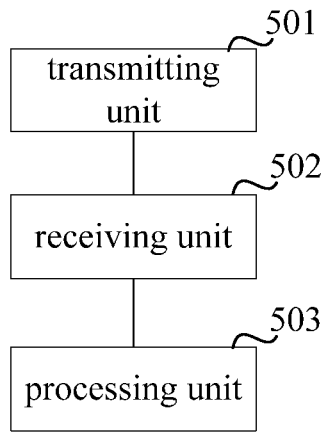
FIG. 5 a schematic structural diagram of a network device according to some embodiments of the present disclosure.

Based on similar technical concept, FIG. 5 schematically shows a network device according to some embodiments of the present disclosure for executing steps of the foregoing method. As shown in FIG. 5, the network device according to the embodiments of the present disclosure includes a transmitting unit 501, a receiving unit 502 and a processing unit 503.

The transmitting unit 501 is used to indicate a channel state information (CSI) feedback configuration group for a CSI feedback to a terminal.

The receiving unit 502 is used to receive CSI which is obtained by the terminal through a CSI measurement based on a determined CSI feedback approach corresponding to the CSI feedback configuration group.

The processing unit 503 is used to perform a downlink data transmission based on the CSI fed back from the terminal, or update CSI feedback configuration information based on the CSI fed back from the terminal.

Optionally, the CSI feedback approach includes a first feedback approach and a second feedback approach. For the first feedback approach, CSI obtained through a measurement based on each CSI feedback configuration in a CSI feedback configuration group is fed back. For the second feedback approach, an optimum CSI feedback configuration is selected from the CSI feedback configuration group, then CSI obtained through a measurement based on the optimum CSI feedback configuration in the CSI feedback configuration group and location information of the optimum CSI feedback configuration in the CSI feedback configuration group are fed back.

Optionally, the location information of the optimum CSI feedback configuration in the CSI feedback configuration group may refer to an index of the optimum CSI feedback configuration in the CSI feedback configuration group; or may refer to a value of a corresponding bit where the optimum CSI feedback configuration is located in a location list corresponding to the CSI feedback configuration group, where each CSI feedback configuration in the CSI feedback configuration group corresponds to one location in the location list.

Optionally, the processing unit 501 is used to indicate a quantity of a CSI feedback configuration included in the CSI feedback configuration group and requiring CSI feedback to the terminal. Optionally, the quantity of the CSI feedback configuration included in the CSI feedback configuration group and requiring CSI feedback is carried in the CSI feedback configuration group and indicated to the terminal in advance.

Optionally, the processing unit 501 is used to indicate feedback approach indication information corresponding to the CSI feedback configuration group to the terminal, such that the terminal determines the CSI feedback approach corresponding to the CSI feedback configuration group based on the feedback approach indication information corresponding to the CSI feedback configuration group. Each CSI feedback configuration group is configured with corresponding feedback approach indication information.

Optionally, the processing unit 501 is used to indicate a feedback mode of the CSI feedback configuration group to the terminal, such that the terminal determines the CSI feedback approach corresponding to the CSI feedback configuration group based on the feedback mode of the CSI feedback configuration group. The feedback mode of the CSI feedback configuration group includes a periodic CSI feedback and an aperiodic CSI feedback.

Optionally, the processing unit 501 is used to indicate the quantity of the CSI feedback configuration included in the CSI feedback configuration group and requiring CSI feedback to the terminal via indication information included in a triggering signaling of an aperiodic CSI feedback.

Optionally, the feedback approach indication information corresponding to the CSI feedback configuration group is included in the CSI feedback configuration group. The transmitting unit 501 indicates the feedback approach indication information corresponding to the CSI feedback configuration group to the terminal by indicating the CSI feedback configuration group to the terminal.

Optionally, in the case that the determined feedback approach is the second feedback approach and the CSI that is obtained through the measurement based on the optimum CSI feedback configuration in the CSI feedback configuration group and fed back includes a rank indicator (RI), a feedback period of the location information is N times of a feedback period of the RI and a PUCCH resource location of the location information is identical to a PUCCH resource location of the RI. Here, N is a positive integer.

Optionally, in the case that the location information and the RI are fed back in one subframe, the location information and the RI are first joint-coded or cascaded and then fed back.

Optionally, when feeding back the location information and the RI in one subframe, RI is obtained through a measurement based on an optimum CSI feedback configuration corresponding to the location information fed back in the subframe.

Optionally, when feeding back the location information and the RI in different subframes, the RI is obtained through a CSI measurement based on an optimum CSI feedback configuration corresponding to location information that is most recently fed back.

Optionally, in the case that the determined feedback approach is the second feedback approach and the CSI that is obtained through a measurement based on the optimum CSI feedback configuration in the CSI feedback configuration group and then fed back includes at least one of a pre-coding matrix indicator (PMI) and a channels quality indication (CQI), the at least one of the PMI and the CQI is obtained through a CSI measurement based on the optimum CSI feedback configuration corresponding to the location information that is most recently fed back.

In view of the above description, the network device indicates the CSI feedback configuration group for CSI feedback to the terminal, and after receiving the CSI feedback configuration group, the terminal determines a CSI feedback approach corresponding to the CSI feedback configuration group. In this way, the terminal performs CSI measurement and CSI feedback based on the CSI feedback configuration group configured by the network device, the terminal can support CSI feedback approaches under both an FD-MIMO mode and a non-FD-MIMO mode of the network device.

Figure 6:
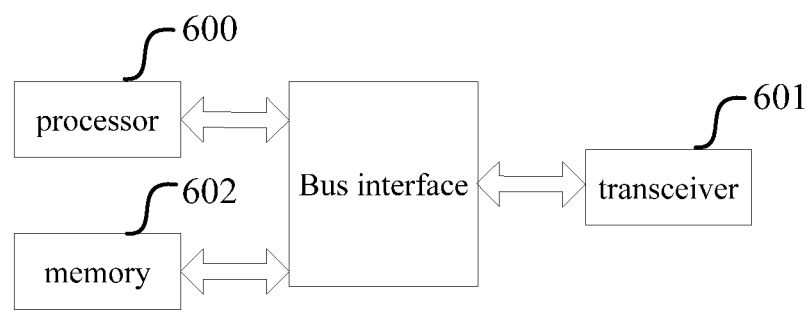
FIG. 6 a schematic structural diagram of a terminal according to some embodiments of the present disclosure.

Based on similar technical concept, FIG. 6 schematically shows a terminal according to some embodiments of the present disclosure for executing steps of the foregoing method. As shown in FIG. 6, the terminal according to the embodiments of the present disclosure includes a processor 600, a transceiver 601 and a memory 602.

The processor 600 is used to read a program in the memory 602 to:

receive a channel state information (CSI) feedback configuration group indicated by a network device for a CSI feedback;

determine a CSI feedback approach corresponding to the CSI feedback configuration group; and perform a CSI measurement and the CSI feedback based on the determined CSI feedback approach.

The transceiver 601 is used to receive and transmit data under control of the processor 600.

Optionally, the CSI feedback approach may include a first feedback approach and a second feedback approach. For the first feedback approach, CSI obtained through a measurement based on each CSI feedback configuration in a CSI feedback configuration group is fed back. For the second feedback approach, an optimum CSI feedback configuration is selected from the CSI feedback configuration group, then CSI obtained through a measurement based on the optimum CSI feedback configuration in the CSI feedback configuration group and location information of the optimum CSI feedback configuration in the CSI feedback configuration group are fed back.

Optionally, the processor 600 is used to: measure a reference signal receiving power (RSRP) for each CSI feedback configuration in the CSI feedback configuration group and select a CSI feedback configuration corresponding to a largest RSRP in one or multiple RSRPs determined through the measurement as the optimum CSI feedback configuration in the CSI feedback configuration group; or estimate a channels quality indication (CQI) for each CSI feedback configuration in the CSI feedback configuration group and select a CSI feedback configuration corresponding to a largest CQI in one or multiple CQIs determined through the estimation as the optimum CSI feedback configuration in the CSI feedback configuration group; or perform a CSI measurement on each CSI feedback configuration in the CSI feedback configuration group, obtain a transport block size (TBsize) corresponding to each CSI feedback configuration based on a result of the CSI measurement, and select a CSI feedback configuration corresponding to a largest TBsize in one or multiple obtained TBsizes as the optimum CSI feedback configuration in the CSI feedback configuration group.

Optionally, the location information of the optimum CSI feedback configuration in the CSI feedback configuration group refers to an index of the optimum CSI feedback configuration in the CSI feedback configuration group, or refers to a value of a corresponding bit where the optimum CSI feedback configuration is located in a location list corresponding to the CSI feedback configuration group, where each CSI feedback configuration in the CSI feedback configuration group corresponds to one location in the location list.

Optionally, in the case that the determined feedback approach is the second feedback approach and the CSI that is obtained through the measurement based on the optimum CSI feedback configuration in the CSI feedback configuration group and fed back includes a rank indicator (RI), a feedback period of the location information is N times of a feedback period of the RI and a PUCCH resource location of the location information is identical to a PUCCH resource location of the RI. Here, N is a positive integer.

Optionally, in the case that the location information and the RI are fed back in one subframe, the location information and the RI are first joint-coded or cascaded and then fed back.

Optionally, when feeding back the location information and the RI in one subframe, the RI is obtained through a measurement based on an optimum CSI feedback configuration corresponding to the location information fed back in the subframe.

Optionally, when feeding back the location information and the RI in different subframes, the RI is obtained through a CSI measurement based on an optimum CSI feedback configuration corresponding to location information that is most recently fed back.

Optionally, in the case that the determined feedback approach is the second feedback approach and the CSI that is obtained through a measurement based on the optimum CSI feedback configuration in the CSI feedback configuration group and then fed back includes at least one of a pre-coding matrix indicator (PMI) and a channels quality indication (CQI), the at least one of the PMI and the CQI is obtained through a CSI measurement based on the optimum CSI feedback configuration corresponding to the location information that is most recently fed back.

Optionally, the processor 600 is used to: determine the CSI feedback approach corresponding to the CSI feedback configuration group based on a quantity of a CSI feedback configuration included in the CSI feedback configuration group; or determine the CSI feedback approach corresponding to the CSI feedback configuration group based on a quantity of a CSI feedback configuration included in the CSI feedback configuration group and requiring CSI feedback; or determine the CSI feedback approach corresponding to the CSI feedback configuration group based on feedback approach indication information included in a received triggering signaling of an aperiodic CSI feedback; or determine the CSI feedback approach corresponding to the CSI feedback configuration group based on feedback approach indication information corresponding to the CSI feedback configuration group, each CSI feedback configuration group being configured with corresponding feedback approach indication information; or determine the CSI feedback approach corresponding to the CSI feedback configuration group based on a feedback mode of the CSI feedback configuration group, the feedback mode of the CSI feedback configuration group including a periodic CSI feedback and an aperiodic CSI feedback.

Optionally, the processor 600 is used to: determine, in the case that the CSI feedback configuration group includes only one CSI feedback configuration, the first feedback approach to be applied for the CSI feedback configuration group, where the first feedback approach refers to feed back CSI corresponding to each CSI feedback configuration in the CSI feedback configuration group; or determine, in the case that the CSI feedback configuration group includes multiple CSI feedback configurations, the second feedback approach to be applied for the CSI feedback configuration group, where the second feedback approach refers to feed back CSI corresponding to an optimum CSI feedback configuration in the CSI feedback configuration group and location information of the optimum CSI feedback configuration in the CSI feedback configuration group.

Optionally, the processor 600 is used to: determine, in the case that each CSI feedback configuration in the CSI feedback configuration group requires CSI feedback, the first feedback approach to be applied for the CSI feedback configuration group; otherwise, determine the second feedback approach to be applied for the CSI feedback configuration group. The first feedback approach refers to feed back CSI corresponding to each CSI feedback configuration in the CSI feedback configuration group. The second feedback approach refers to feed back CSI corresponding to an optimum CSI feedback configuration in the CSI feedback configuration group and location information of the optimum CSI feedback configuration in the CSI feedback configuration group.

Optionally, the quantity of the CSI feedback configuration included in the CSI feedback configuration group and requiring CSI feedback is predetermined; or the quantity of the CSI feedback configuration included in the CSI feedback configuration group and requiring CSI feedback is configured by the network device; or the quantity of the CSI feedback configuration included in the CSI feedback configuration group and requiring CSI feedback is indicated by the network device via indication information included in a triggering signaling of an aperiodic CSI feedback.

Optionally, the feedback approach indication information corresponding to the CSI feedback configuration group is included in the CSI feedback configuration group.

Optionally, the processor 600 is used to: determine, in the case that the feedback mode of the CSI feedback configuration group is the periodic CSI feedback, the first feedback approach as the CSI feedback approach corresponding to the CSI feedback configuration group, where the first feedback approach refers to feed back CSI corresponding to each CSI feedback configuration in the CSI feedback configuration group; or determine, in the case that the feedback mode of the CSI feedback configuration group is the aperiodic CSI feedback, the second feedback approach as the CSI feedback approach corresponding to the CSI feedback configuration group, where the second feedback approach refers to feed back CSI corresponding to an optimum CSI feedback configuration in the CSI feedback configuration group and location information of the optimum CSI feedback configuration in the CSI feedback configuration group.

In FIG. 6, a bus architecture may include a number of buses and bridges that are connected to each other, such that circuits of one or more processors represented by the processor 600 and circuits of memory represented by the memory 602 are connected. The bus architecture can connect circuits such us a peripheral device, a voltage regulator or a power management circuit together, which is well known in the field and is not detailed herein. The bus interface provides interfaces. The transceiver 601 may include multiple components, for example, may include a transmitter and a receiver and provide units for communicating with other devices via a transmitting medium. The processor 600 manages the bus architecture and also takes in charge of general processing. The memory 602 can store data to be used by the processor 600 during performing related operations.

In view of the above description, the network device indicates the CSI feedback configuration group for CSI feedback to the terminal, and after receiving the CSI feedback configuration group, the terminal determines a CSI feedback approach corresponding to the CSI feedback configuration group. In this way, the terminal performs CSI measurement and CSI feedback based on the CSI feedback configuration group configured by the network device, the terminal can support CSI feedback approaches under both an FD-MIMO mode and a non-FD-MIMO mode of the network device.

Figure 7:
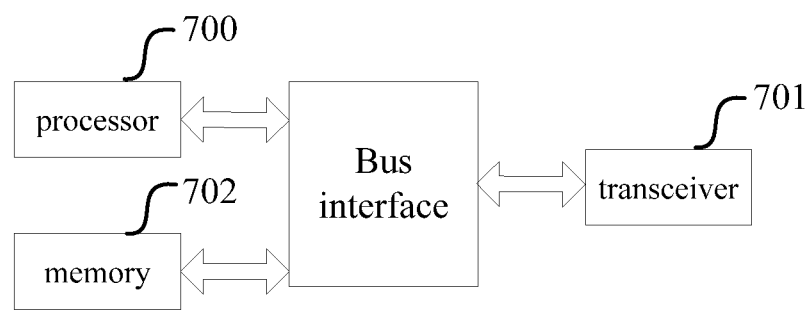
FIG. 7 a schematic structural diagram of a network device according to some embodiments of the present disclosure.

Based on similar technical concept, FIG. 7 schematically shows a network device according to some embodiments of the present disclosure for executing steps of the foregoing method. As shown in FIG. 7, the network device according to the embodiments of the present disclosure includes a processor 700, a transceiver 701 and a memory 702.

The processor 700 is used to read a program in the memory 702 to:

indicate a channel state information (CSI) feedback configuration group for a CSI feedback to a terminal;

receive CSI which is obtained by the terminal through a CSI measurement based on a determined CSI feedback approach corresponding to the CSI feedback configuration group; and perform a downlink data transmission based on the CSI fed back from the terminal, or update CSI feedback configuration information based on the CSI fed back from the terminal.

The transceiver 701 is used to transmit and receive data under control of the processor 700.

Optionally, the CSI feedback approach includes a first feedback approach and a second feedback approach. For the first feedback approach, CSI obtained through a measurement based on each CSI feedback configuration in a CSI feedback configuration group is fed back. For the second feedback approach, an optimum CSI feedback configuration is selected from the CSI feedback configuration group, then CSI obtained through a measurement based on the optimum CSI feedback configuration in the CSI feedback configuration group and location information of the optimum CSI feedback configuration in the CSI feedback configuration group are fed back.

Optionally, the location information of the optimum CSI feedback configuration in the CSI feedback configuration group may refer to an index of the optimum CSI feedback configuration in the CSI feedback configuration group; or may refer to a value of a corresponding bit where the optimum CSI feedback configuration is located in a location list corresponding to the CSI feedback configuration group, where each CSI feedback configuration in the CSI feedback configuration group corresponds to one location in the location list.

Optionally, in the case that the determined feedback approach is the second feedback approach and the CSI that is obtained through the measurement based on the optimum CSI feedback configuration in the CSI feedback configuration group and fed back includes a rank indicator (RI), a feedback period of the location information is N times of a feedback period of the RI and a PUCCH resource location of the location information is identical to a PUCCH resource location of the RI. Here, N is a positive integer.

Optionally, in the case that the location information and the RI are fed back in one subframe, the location information and the RI are first joint-coded or cascaded and then fed back.

Optionally, when feeding back the location information and the RI in one subframe, RI is obtained through a measurement based on an optimum CSI feedback configuration corresponding to the location information fed back in the subframe.

Optionally, when feeding back the location information and the RI in different subframes, the RI is obtained through a CSI measurement based on an optimum CSI feedback configuration corresponding to location information that is most recently fed back.

Optionally, in the case that the determined feedback approach is the second feedback approach and the CSI that is obtained through a measurement based on the optimum CSI feedback configuration in the CSI feedback configuration group and then fed back includes at least one of a pre-coding matrix indicator (PMI) and a channels quality indication (CQI), the at least one of the PMI and the CQI is obtained through a CSI measurement based on the optimum CSI feedback configuration corresponding to the location information that is most recently fed back.

Optionally, the processor 700 is used to indicate a quantity of a CSI feedback configuration included in the CSI feedback configuration group and requiring CSI feedback to the terminal. Optionally, the quantity of the CSI feedback configuration included in the CSI feedback configuration group and requiring CSI feedback is carried in the CSI feedback configuration group and indicated to the terminal in advance.

Optionally, the processor 700 is used to indicate feedback approach indication information corresponding to the CSI feedback configuration group to the terminal, such that the terminal determines the CSI feedback approach corresponding to the CSI feedback configuration group based on the feedback approach indication information corresponding to the CSI feedback configuration group. Each CSI feedback configuration group is configured with corresponding feedback approach indication information.

Optionally, the processor 700 is used to indicate a feedback mode of the CSI feedback configuration group to the terminal, such that the terminal determines the CSI feedback approach corresponding to the CSI feedback configuration group based on the feedback mode of the CSI feedback configuration group. The feedback mode of the CSI feedback configuration group includes a periodic CSI feedback and an aperiodic CSI feedback.

Optionally, the processor 700 is used to indicate the quantity of the CSI feedback configuration included in the CSI feedback configuration group and requiring CSI feedback to the terminal via indication information included in a triggering signaling of an aperiodic CSI feedback.

Optionally, the feedback approach indication information corresponding to the CSI feedback configuration group is included in the CSI feedback configuration group. The processor 700 indicates the feedback approach indication information corresponding to the CSI feedback configuration group to the terminal by indicating the CSI feedback configuration group to the terminal.

In FIG. 7, a bus architecture may include a number of buses and bridges that are connected to each other, such that circuits of one or more processors represented by the processor 700 and circuits of memory represented by the memory 702 are connected. The bus architecture can connect circuits such us a peripheral device, a voltage regulator or a power management circuit together, which is well known in the field and is not detailed herein. The bus interface provides interfaces. The transceiver 701 may include multiple components, for example, may include a transmitter and a receiver and provide units for communicating with other devices via a transmitting medium. The processor 700 manages the bus architecture and also takes in charge of general processing. The memory 702 can store data to be used by the processor 700 during performing related operations.

In view of the above description, the network device indicates the CSI feedback configuration group for CSI feedback to the terminal, and after receiving the CSI feedback configuration group, the terminal determines a CSI feedback approach corresponding to the CSI feedback configuration group. In this way, the terminal performs CSI measurement and CSI feedback based on the CSI feedback configuration group configured by the network device, the terminal can support CSI feedback approaches under both an FD-MIMO mode and a non-FD-MIMO mode of the network device.

It should be noted by the ordinary skilled in the art that the present disclosure can be embodied as a method or a computer program product. The present disclosure can adopt hardware embodiments, software embodiments or combination thereof. In addition, the present disclosure can be embodied as a computer program product which can be realized on one or more computer accessible storage media (including but not limited to a magnetic disk memory, a CD-ROM, an optical memory) where stores computer readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although preferred embodiments of the present disclosure have been described, the ordinary skilled in the art can make changes and modifications to the disclosed embodiments once acquiring basic creative concepts of the present disclosure. Hence, the appended list of claims intends to contain all the preferred embodiments and all changes and modification falling into the scope of the present disclosure.

The ordinary skilled in the art can make various changes and modifications without departing from the spirit and scope of the present disclosure. The present intends to include all these changes and modifications if they fall within the list of claims or equivalent techniques.

What is claimed is:

1. A channel state information (CSI) feedback method, comprising:
   receiving a CSI feedback configuration group indicated by a network device for a CSI feedback;
   determining a CSI feedback approach corresponding to the CSI feedback configuration group; and
   performing a CSI measurement and the CSI feedback based on the determined CSI feedback approach;
   wherein the CSI feedback approach comprises a first feedback approach and a second feedback approach;
   the first feedback approach comprises: feeding back CSI obtained through a measurement based on each CSI feedback configuration in the CSI feedback configuration group; and
   the second feedback approach comprises: selecting an optimum CSI feedback configuration from the CSI feedback configuration group, and feeding back CSI obtained through a measurement based on the optimum CSI feedback configuration in the CSI feedback configuration group and location information of the optimum CSI feedback configuration in the CSI feedback configuration group.

2. The CSI feedback method according to claim 1, wherein the location information of the optimum CSI feedback configuration in the CSI feedback configuration group refers to an index of the optimum CSI feedback configuration in the CSI feedback configuration group, or refers to a value of a corresponding bit where the optimum CSI feedback configuration is located in a location list corresponding to the CSI feedback configuration group, wherein each CSI feedback configuration in the CSI feedback configuration group corresponds to one location in the location list.

3. The CSI feedback method according to claim 1, wherein in the case that the determined feedback approach is the second feedback approach and the CSI that is obtained through the measurement based on the optimum CSI feedback configuration in the CSI feedback configuration group and fed back comprises a rank indicator (RI), a feedback period of the location information is N times of a feedback period of the RI and a physical uplink control channel (PUCCH) resource location of the location information is identical to a PUCCH resource location of the RI, where N is a positive integer.

4. The CSI feedback method according to claim 3, wherein in the case that the location information and the RI are fed back in one subframe, the location information and the RI are first joint-coded or cascaded and then fed back.

5. The CSI feedback method according to claim 3, wherein in the case that the location information and the RI are fed back in one subframe, the RI is obtained through a measurement based on an optimum CSI feedback configuration corresponding to the location information fed back in the subframe.

6. The CSI feedback method according to claim 3, wherein in the case that the location information and the RI are fed back in different subframes, the RI is obtained through a CSI measurement based on an optimum CSI feedback configuration corresponding to the location information that is most recently fed back.

7. The CSI feedback method according to claim 1, wherein the step of determining the CSI feedback approach corresponding to the CSI feedback configuration group comprises:
determining the CSI feedback approach corresponding to the CSI feedback configuration group based on a quantity of a CSI feedback configuration comprised in the CSI feedback configuration group; or
determining the CSI feedback approach corresponding to the CSI feedback configuration group based on a quantity of a CSI feedback configuration comprised in the CSI feedback configuration group and requiring the CSI feedback; or
determining the CSI feedback approach corresponding to the CSI feedback configuration group based on feedback approach indication information comprised in a received triggering signaling of an aperiodic CSI feedback; or
determining the CSI feedback approach corresponding to the CSI feedback configuration group based on feedback approach indication information corresponding to the CSI feedback configuration group, wherein each CSI feedback configuration group is configured with corresponding feedback approach indication information; or
determining the CSI feedback approach corresponding to the CSI feedback configuration group based on a feedback mode of the CSI feedback configuration group, wherein the feedback mode of the CSI feedback configuration group comprises a periodic CSI feedback and an aperiodic CSI feedback.

8. The CSI feedback method according to claim 7, wherein the step of determining the CSI feedback approach corresponding to the CSI feedback configuration group based on the quantity of the CSI feedback configuration comprised in the CSI feedback configuration group comprises:
determining a first feedback approach to be applied for the CSI feedback configuration group in the case that the CSI feedback configuration group comprises only one CSI feedback configuration, wherein the first feedback approach refers to feed back CSI corresponding to each CSI feedback configuration in the CSI feedback configuration group; or
determining a second feedback approach to be applied for the CSI feedback configuration group in the case that the CSI feedback configuration group comprises a plurality of CSI feedback configurations, wherein the second feedback approach refers to feed back CSI corresponding to an optimum CSI feedback configuration in the CSI feedback configuration group and location information of the optimum CSI feedback configuration in the CSI feedback configuration group.

9. The CSI feedback method according to claim 7, wherein the step of determining the CSI feedback approach corresponding to the CSI feedback configuration group based on the quantity of the CSI feedback configuration comprised in the CSI feedback configuration group and requiring the CSI feedback comprises:
determining, in the case that each CSI feedback configuration in the CSI feedback configuration group requires the CSI feedback, a first feedback approach to be applied for the CSI feedback configuration group; otherwise, determining a second feedback approach to be applied for the CSI feedback configuration group;
wherein the first feedback approach refers to feed back CSI corresponding to each CSI feedback configuration in the CSI feedback configuration group, and the second feedback approach refers to feed back CSI corresponding to an optimum CSI feedback configuration in the CSI feedback configuration group and location information of the optimum CSI feedback configuration in the CSI feedback configuration group.

10. The CSI feedback method according to claim 7, wherein the step of determining the CSI feedback approach corresponding to the CSI feedback configuration group based on the feedback mode of the CSI feedback configuration group comprises:
determining, in the case that the feedback mode of the CSI feedback configuration group is the periodic CSI feedback, a first feedback approach as the CSI feedback approach corresponding to the CSI feedback configuration group, wherein the first feedback approach refers to feed back CSI corresponding to each CSI feedback configuration in the CSI feedback configuration group; or
determining, in the case that the feedback mode of the CSI feedback configuration group is the aperiodic CSI feedback, a second feedback approach as the CSI feedback approach corresponding to the CSI feedback configuration group, wherein the second feedback approach refers to feed back CSI corresponding to an optimum CSI feedback configuration in the CSI feedback configuration group and location information of the optimum CSI feedback configuration in the CSI feedback configuration group.

11. A terminal, comprising a processor and a transceiver, wherein the processor is configured to read a program in a memory to:
receive a channel state information (CSI) feedback configuration group indicated by a network device for a CSI feedback;
determine a CSI feedback approach corresponding to the CSI feedback configuration group; and
perform a CSI measurement and the CSI feedback based on the determined CSI feedback approach; and
wherein the transceiver is configured to receive and transmit data under control of the processor;
wherein the CSI feedback approach comprises a first feedback approach and a second feedback approach;
the first feedback approach comprises: feeding back CSI obtained through a measurement based on each CSI feedback configuration in the CSI feedback configuration group; and the second feedback approach comprises: selecting an optimum CSI feedback configuration from the CSI feedback configuration group, and feeding back CSI obtained through a measurement based on the optimum CSI feedback configuration in the CSI feedback configuration group and location information of the optimum CSI feedback configuration in the CSI feedback configuration group.

12. The terminal according to claim 11, wherein the location information of the optimum CSI feedback configuration in the CSI feedback configuration group refers to an index of the optimum CSI feedback configuration in the CSI feedback configuration group, or refers to a value of a corresponding bit where the optimum CSI feedback configuration is located in a location list corresponding to the CSI feedback configuration group, wherein each CSI feedback configuration in the CSI feedback configuration group corresponds to one location in the location list.

13. The terminal according to claim 11, wherein in the case that the determined feedback approach is the second feedback approach and the CSI that is obtained through the measurement based on the optimum CSI feedback configuration in the CSI feedback configuration group and fed back comprises a rank indicator (RI), a feedback period of the location information is N times of a feedback period of the RI and a physical uplink control channel (PUCCH) resource location of the location information is identical to a PUCCH resource location of the RI, where N is a positive integer.

14. The terminal according to claim 12, wherein in the case that the location information and the RI are fed back in one subframe, the location information and the RI are first joint-coded or cascaded and then fed back; or
in the case that the location information and the RI are fed back in one subframe, the RI is obtained through a measurement based on an optimum CSI feedback configuration corresponding to the location information fed back in the subframe; or
in the case that the location information and the RI are fed back in different subframes, the RI is obtained through a CSI measurement based on an optimum CSI feedback configuration corresponding to the location information that is most recently fed back.

15. The terminal according to claim 11, wherein the processor is configured to:
determine the CSI feedback approach corresponding to the CSI feedback configuration group based on a quantity of a CSI feedback configuration comprised in the CSI feedback configuration group; or
determine the CSI feedback approach corresponding to the CSI feedback configuration group based on a quantity of a CSI feedback configuration comprised in the CSI feedback configuration group and requiring the CSI feedback; or
determine the CSI feedback approach corresponding to the CSI feedback configuration group based on feedback approach indication information comprised in a received triggering signaling of an aperiodic CSI feedback; or
determine the CSI feedback approach corresponding to the CSI feedback configuration group based on feedback approach indication information corresponding to the CSI feedback configuration group, each CSI feedback configuration group being configured with corresponding feedback approach indication information; or
determine the CSI feedback approach corresponding to the CSI feedback configuration group based on a feedback mode of the CSI feedback configuration group, the feedback mode of the CSI feedback configuration group comprising a periodic CSI feedback and an aperiodic CSI feedback.

16. The terminal according to claim 15, wherein the processor is configured to:
determine, in the case that the CSI feedback configuration group comprises only one CSI feedback configuration, a first feedback approach to be applied for the CSI feedback configuration group, wherein the first feedback approach refers to feed back CSI corresponding to each CSI feedback configuration in the CSI feedback configuration group; or
determine, in the case that the CSI feedback configuration group comprises a plurality of CSI feedback configurations, a second feedback approach to be applied for the CSI feedback configuration group, wherein the second feedback approach refers to feed back CSI corresponding to an optimum CSI feedback configuration in the CSI feedback configuration group and location information of the optimum CSI feedback configuration in the CSI feedback configuration group.

17. The terminal according to claim 15, wherein the processor is configured to:
determine, in the case that each CSI feedback configuration in the CSI feedback configuration group requires the CSI feedback, a first feedback approach to be applied for the CSI feedback configuration group; otherwise, determine a second feedback approach to be applied for the CSI feedback configuration group;
wherein the first feedback approach refers to feed baCk CSI corresponding to each CSI feedback configuration in the CSI feedback configuration group, and the second feedback approach refers to feed back CSI corresponding to an optimum CSI feedback configuration in the CSI feedback configuration group and location information of the optimum CSI feedback configuration in the CSI feedback configuration group.

18. The terminal according to claim 15, wherein the processor is configured to:
determine, in the case that the feedback mode of the CSI feedback configuration group is the periodic CSI feedback, a first feedback approach as the CSI feedback approach corresponding to the CSI feedback configuration group, wherein the first feedback approach refers to feed back CSI corresponding to each CSI feedback configuration in the CSI feedback configuration group; or
determine, in the case that the feedback mode of the CSI feedback configuration group is the aperiodic CSI feedback, a second feedback approach as the CSI feedback approach corresponding to the CSI feedback configuration group, wherein the second feedback approach refers to feed back CSI corresponding to an optimum CSI feedback configuration in the CSI feedback configuration group and location information of the optimum CSI feedback configuration in the CSI feedback configuration group.

* * * * *